(12) United States Patent
Colombo

(10) Patent No.: US 10,740,041 B2
(45) Date of Patent: Aug. 11, 2020

(54) PROCESSING SYSTEM, RELATED INTEGRATED CIRCUIT, DEVICE AND METHOD

(71) Applicant: STMicroelectronics Application GMBH, Ascheim-Dornach (DE)

(72) Inventor: Roberto Colombo, Munich (DE)

(73) Assignee: STMicroelectronics Application GmbH, Ascheim-Dornach (DE)

(*) Notice: Subject to any disclaimer, the term of this patent is extended or adjusted under 35 U.S.C. 154(b) by 252 days.

(21) Appl. No.: 15/991,208

(22) Filed: May 29, 2018

(65) Prior Publication Data

US 2018/0357015 A1    Dec. 13, 2018

(30) Foreign Application Priority Data

Jun. 8, 2017   (IT) .......................... 102017000062788

(51) Int. Cl.
| | | |
|---|---|---|
| *G06F 3/06* | (2006.01) | |
| *G06F 13/38* | (2006.01) | |
| *G05B 19/05* | (2006.01) | |
| *G06F 12/02* | (2006.01) | |
| *G06F 21/76* | (2013.01) | |

(52) U.S. Cl.
CPC ......... *G06F 3/0679* (2013.01); *G05B 19/056* (2013.01); *G06F 12/0246* (2013.01); *G06F 13/38* (2013.01); *G06F 21/76* (2013.01)

(58) Field of Classification Search
None
See application file for complete search history.

(56) References Cited

U.S. PATENT DOCUMENTS

| | | |
|---|---|---|
| 5,379,382 A | 1/1995 | Work et al. |
| 6,643,777 B1 | 11/2003 | Chu |
| 2004/0210720 A1 | 10/2004 | Wong et al. |
| 2006/0177064 A1 | 8/2006 | Holtzman et al. |
| 2012/0029664 A1 | 2/2012 | Chand et al. |
| 2013/0185482 A1 | 7/2013 | Kim et al. |
| 2015/0331043 A1 | 11/2015 | Sastry et al. |
| 2015/0339467 A1* | 11/2015 | Morita .................... G06F 21/31 726/1 |
| 2015/0370580 A1 | 12/2015 | Litovtchenko |
| 2016/0078208 A1* | 3/2016 | Namiki ............... G06F 21/6218 726/1 |
| 2017/0124354 A1* | 5/2017 | Rohleder ................ G06F 21/70 |

\* cited by examiner

*Primary Examiner* — Denise Tran
(74) *Attorney, Agent, or Firm* — Slater Matsil, LLP

(57) ABSTRACT

A processing system includes a processing unit and a hardware block configured to change operation as a function of life cycle data. A one-time programmable memory includes original life cycle data. A hardware configuration module is configured to read the original life cycle data from the one-time programmable memory and provide the original life cycle data to the hardware block. The hardware configuration module includes a register providing the life cycle data used to change operation of the hardware block. The hardware configuration module is configured to store the original life cycle data in the register and receive a command from the processing unit. The command includes a write request for storing new life cycle data in the register.

23 Claims, 12 Drawing Sheets

PROCESSING SYSTEM, RELATED INTEGRATED CIRCUIT, DEVICE AND METHOD

CROSS-REFERENCE TO RELATED APPLICATIONS

This application claims priority to Italian Patent Application No. 102017000062788, filed on Jun. 8, 2017, which application is hereby incorporated herein by reference.

TECHNICAL FIELD

Embodiments of the present disclosure relate to processing systems, such as micro-controllers, having associated a memory in which configuration data are stored.

BACKGROUND

FIG. 1 shows a typical electronic system, such as the electronic system of a vehicle, comprising a plurality of processing systems 10, such as embedded systems or integrated circuits, e.g., a FPGA (Field Programmable Gate Array), DSP (Digital Signal Processor) or a micro-controller (e.g., dedicated to the automotive market).

For example, FIG. 1 shows three processing systems $10_1$, $10_2$ and $10_3$ connected through a suitable communication system 20. For example, the communication system may include a vehicle control bus, such as a CAN (Controller Area Network) bus, and possibly a multimedia bus, such as a MOST (Media Oriented Systems Transport) bus, connected to vehicle control bus via a gateway. Typically, the processing systems 10 are located at different positions of the vehicle and may include, e.g., an Engine Control Unit (ECU), a Transmission Control Unit (TCU), an Anti-lock Braking System (ABS), a body control modules (BCM), and/or a navigation and/or multimedia audio system.

Future generations of processing systems, in particular micro-controllers dedicated to automotive applications, will exhibit a significant increase in complexity, mainly due to the increasing number of functionalities (such as new protocols, new features, etc.) and to the tight constraints concerning the operation conditions of the system (such as lower power consumption, increased calculation power and speed, etc.).

The validation of the various functionalities of each processing system 10 may involve thus a significant portion of the overall development costs: this applies both at the company producing the processing system 10 and the customer side, where the application is developed. For this reason, also the hardware modules within the processing systems 10 implementing security functions are getting more and more important. For example, various processing systems 10 provide the possibility to configure whether the access to the internal resource of the processing system 10 by using an external tool, e.g., a debug interface, is blocked or permitted (possibly specifying whether data may only be read or also written). For example, usually during the development stage it should be possible to control the resources of the processing system 10 with a given degree of freedom, while the processing system 10 should be configured to activate certain security functions (which may not be altered) when the processing system 10 is "in field" (i.e., running in the final application).

For example, most modern micro-controllers use solutions where the enabling of a security feature is done by programming the on/off status in a non-volatile memory. These configuration data are then read during the reset phase in order to enable or disable the related protections, e.g., in order to disable the debug interface of the micro-controller. Thus, a relevant portion of the security configuration is not alterable anymore after the respective configuration information has been programmed into the non-volatile memory, e.g., because, once the debug interface has been deactivated, it is also impossible to overwrite the configuration data. Accordingly, most of the security configurations, once enforced, are not alterable and the protection is always active. Unfortunately, in this way it is also difficult to analyses possible malfunctions of the processing system 10 occurring only in field.

SUMMARY

Various embodiments of the present disclosure provide solutions able to permit a dynamic configurability of the security configurations of a processing system.

According to one or more embodiments, one or more of the above objectives is achieved by means of a processing system having the features specifically set forth below. Embodiments moreover concern a related integrated circuit, device and method.

As mentioned before various embodiments relate to a processing system permitting a dynamic configurability of the security configurations of a processing system. Specifically, in various embodiments, the processing system permits an overwriting of the life cycle data of the processing system.

Specifically, in various embodiments, the processing system comprises at least one hardware block configured to change operation as a function of life cycle data and a one-time programmable memory comprising original life cycle data. In various embodiments, the processing system may comprise write circuitry to write one or more bits of the original life cycle data stored in the one-time programmable memory, thereby advancing the life cycle indicated by the original life cycle data.

In various embodiments, the processing system comprises also a hardware configuration module configured to read the original life cycle data from the one-time programmable memory and provide the original life cycle data to the at least one hardware block.

Specifically, in various embodiments, the hardware configuration module comprises a register, which provides the life cycle data to the at least one hardware block. Accordingly, initially (e.g., after a start-up of the processing system), the hardware configuration module is configured to store the original life cycle data in this register.

In various embodiments, the processing system comprises also a processing unit. In this case, the hardware configuration module is configured to receive a command from the processing unit, wherein this command comprises a write request for storing new life cycle data in the register. For example, the processing unit may be a microprocessor configured to generate the command via software instructions.

Thus, by storing the new life cycle data in the register, the hardware configuration module may overwrite the life cycle data provided to the at least one hardware block.

In various embodiments, the hardware configuration module may however be configured to selectively execute the write request only when given conditions are satisfied.

For example, in various embodiments, the hardware configuration module may compare the new life cycle data with the original life cycle data in order to determine whether the life cycle stage indicated by the new life cycle data corresponds to a life cycle stage being advanced with respect to the life cycle stage indicated by the original life cycle data. In this case, the hardware configuration module may inhibit the execution of the write request when the life cycle stage indicated by the new life cycle data does not correspond to a life cycle stage being advanced with respect to the life cycle stage indicated by the original life cycle data.

Additionally or alternatively, the hardware configuration module may determine whether the original life cycle data correspond to one or more reference life cycle data, and inhibit execution of the write request when the original life cycle data do or do not correspond to the one or more reference life cycle data (based on whether the reference life cycle data belong to a black or white list).

In various embodiments, the hardware configuration module may also verify a keyword. Specifically, the hardware configuration module may receive a reference keyword and a keyword, and compare the reference keyword with the keyword. Accordingly, the hardware configuration module may inhibit the execution of the write request when the reference keyword does not correspond to the keyword. For example, in various embodiments, the reference keyword may be hardwired and the keyword may be stored in the one-time programmable memory.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "One embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
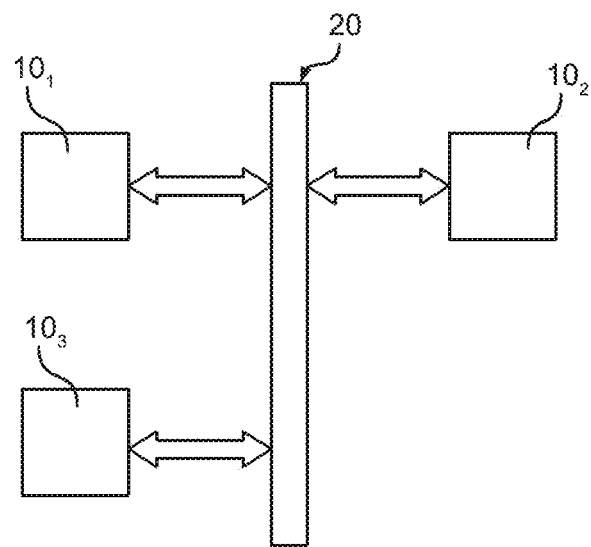
FIG. 1 shows a typical electronic system.

In the following figures elements or components which have already been described with reference to FIG. 1 are denoted by the same references previously used in such Figure. The description of such previously described elements will not be repeated in the following in order not to overburden the present detailed description.

Figure 2:
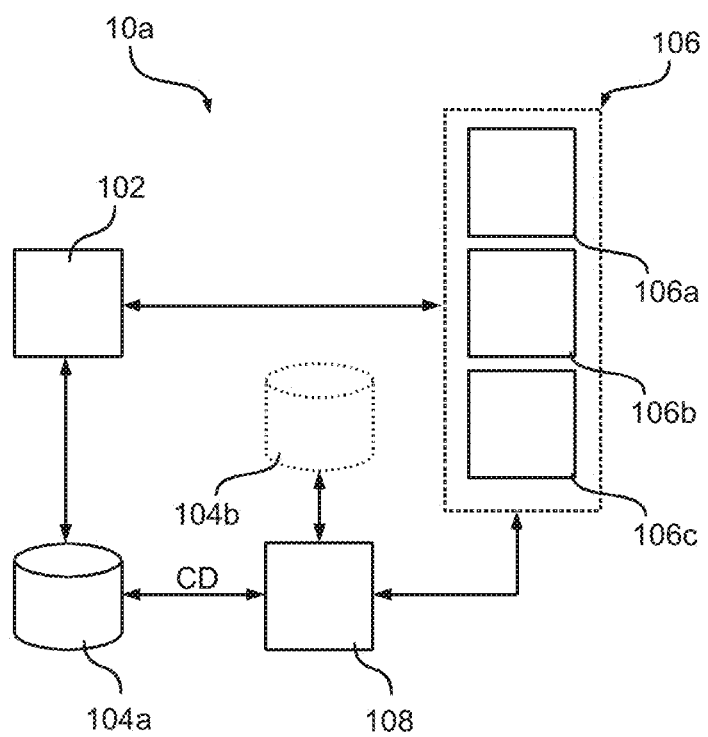
FIG. 2 shows an embodiment of a processing systems comprising a configuration module in accordance with the present disclosure.

FIG. 2 shows a block diagram of an embodiment of a digital processing system 10*a*, such as a micro-controller.

In the embodiment considered, the processing system 10*a* comprises at least one processing unit 102, such as a microprocessor, usually the Central Processing Unit (CPU), programmed via software instructions. Usually, the software executed by the processing unit 102 is stored in a program memory 104*a*, such as a non-volatile memory, such as a Flash memory or EEPROM. Generally, the memory 104*a* may be integrated with the processing unit 102 in a single integrated circuit, or the memory 104*a* may be in the form of a separate integrated circuit and connected to the processing unit 102, e.g., via the traces of a printed circuit board. Thus, in general the memory 104*a* contains the firmware for the processing unit 102, wherein the term firmware includes both the software of a micro-processor and the programming data of a programmable logic circuit, such as a FPGA.

In the embodiment considered, the processing unit 102 may have associated one or more resources 106, such as:

one or more communication interfaces, such as UART (Universal asynchronous receiver/transmitter), SPI (Serial Peripheral Interface Bus), I$^2$C (Inter-Integrated Circuit), CAN bus (Controller Area Network), Ethernet, and/or debug interface; and/or one or more analog-to-digital and/or digital-to-analog converters; and/or one or more dedicated digital components, such as hardware timers and/or counters, or a cryptographic co-processor; and/or one or more analog components, such as comparators, sensors, such as a temperature sensor, etc.; and/or one or more mixed signal components, such as a PWM (Pulse-Width Modulation) driver.

Accordingly, the digital processing system 10a may support different functionalities. For example, the processing systems may have different hardware architectures. For example, the processing units 102 may have different architectures and processing speeds, and/or the number and type of the hardware resources 106 may vary. Moreover, the behavior of the processing unit 102 is determined by the firmware stored in the memory 104a, e.g., the software instructions to be executed by a microprocessor 102 of a micro-controller 10a. Thus, by installing a different firmware, the same hardware (micro-controller) can be used for different applications.

As mentioned before, the behavior of the processing system 10a may also be varied based on configuration data CD. For example, these configuration data CD may be written into specific areas of the non-volatile program memory 104a and retrieved when the processing system 10a is powered on. Alternatively or in addition, the configuration data CD may be stored in an additional non-volatile memory 104b, such as a one-time programmable (OTP) memory, e.g., implemented with fuses. For example, the program memory 104a may be used, in case the blocks shown in FIG. 2 are integrated in a common integrated circuit. Conversely, an additional non-volatile memory 104b may be used, in case the program memory 104a is an external memory, and only the other blocks are integrated in a common integrated circuit. Accordingly, in various embodiments, the configuration data CD are stored in a non-volatile memory (104a and/or 104b) of the integrated circuit comprising the blocks requiring configuration data, such as the processing unit 102 and/or one or more of the hardware resources 106.

For example, such configuration data CD are often calibration data used to guarantee that the hardware behavior is uniform, thereby compensating possible production process tolerances. For example, this applies often to the calibration of analog components of the processing system, such as a temperature sensor, analog-to-digital converter, voltage reference, etc. For example, a voltage monitor threshold level of an analog comparator could be "trimmed" to the exact intended value by adjusting some levels with configuration/calibration data, which are written by the producer of the hardware of the processing systems, e.g., the micro-controller producer.

Moreover, the configuration data CD may also be used to customize the behavior of the hardware, e.g., the hardware resources 106, according to different application needs. For example, once the firmware of the processing system has been stored in the processing system 10a, some configuration data may be written in order to deactivate the debug interface, which e.g., could be used to download the firmware of the processing system 10a. Thus, generally a first part of the configuration data CD may be written by the producer of the hardware of the processing system (e.g., the producer of an integrated circuit), and/or a second part of the configuration data CD may be written by the developer of the firmware of the processing system boa.

As mentioned before, the programmed configuration data CD may be read during a reset phase, which usually starts as soon as the processing system 10a is powered on.

Specifically, as shown in FIG. 2, the processing system 10a may comprise for this purpose a configuration module 108 configured to read the configuration data CD from the non-volatile memory 104a and/or 104b, and distribute these configuration data CD within the processing system 10a.

Figure 3:
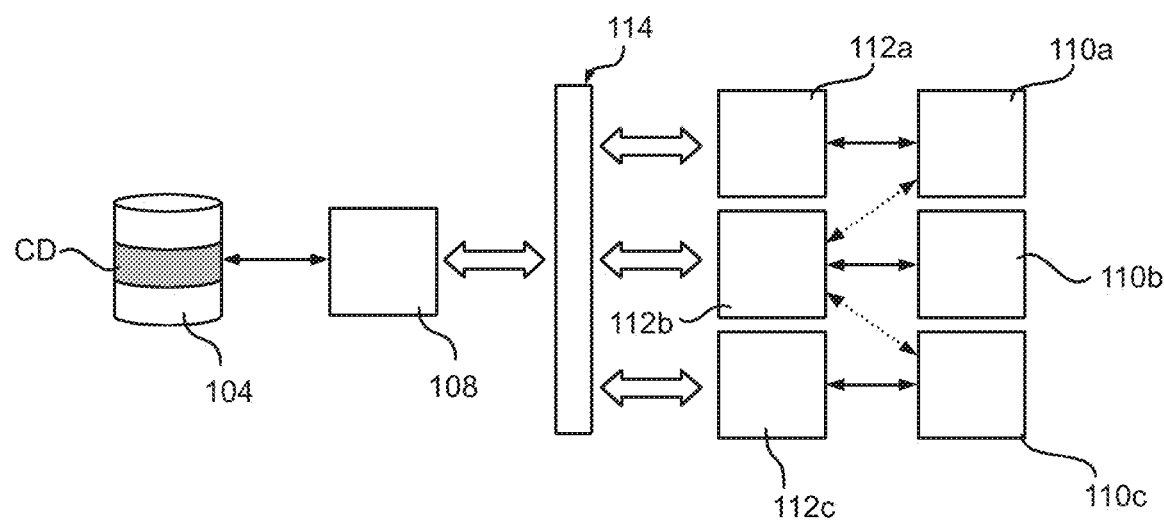
FIG. 3 shows the general architecture of an embodiment of a processing system comprising a configuration module and configuration data clients in accordance with the present disclosure.

For example, FIG. 3 shows a possible embodiment for distributing the configuration data in the processing system 10a of FIG. 2.

In the embodiment considered, one or more configuration data CD are stored in one or more non-volatile memories 104 (i.e., memories 104a and/or 104b). In various embodiments, these configuration data CD are stored in reserved memory areas, e.g., in the form of a plurality of consecutive memory locations.

Accordingly, in the embodiment considered, the configuration module 108 accesses the reserved memory areas containing the configuration data CD, reads the configuration data CD and transmits the configuration data CD to a respective block 110 within the processing system 10a. Generally, the block 110 may correspond to any block of the processing system 10a requiring configuration data and may correspond to the processing unit 102, a hardware resource 106, or even a memory (e.g., the memory 104a). For example, the block 110 may be a debug interface of the processing system 10a, which is enabled or disabled based on the configuration data CD. Similarly, the configuration data CD may be used to configure read and/or write protected areas of a memory.

For example, in order to distribute the configuration data CD, each block 110 may have associated a respective configuration data client 112. For example, in FIG. 3 are shown three blocks 110a, 110b and 110c and three configuration data clients 112a, 112b and 112c. Generally, each configuration data client 112 may be associated univocally to a single hardware block 110, and provided configuration data only to the associated hardware block 110, e.g., a specific hardware resource 106, or may be associated with a plurality of hardware blocks 110, e.g., a plurality of hardware resource 106. In general, the configuration data clients 112a, 112b and 112c may also be integrated in the respective block 110a, 110b and 110c.

Accordingly, in the embodiment considered, the configuration module 108 may determine for each target block 110 to be configured the respective configuration data (selected from the configuration data CD) and transmit the configuration data associated with the target block 110 to the configuration data client 112 associated with the target block 110. Similarly, while reading the configuration data CD from the memory 104, the configuration module 108 may determine the target block(s) for the current configuration information and send the current configuration data to the configuration data client(s) associated with the respective target block(s). Generally, any communication may be used for transmitting the configuration data to the configuration data client 112, including both serial and parallel communications. For example, the configuration module 108 and the configuration data clients 112 may be connected via a bus 114, and each configuration data clients 112 may have associated a respective target address.

Accordingly, each configuration data client 112 is configured to receive the configuration data from the module 108, store them into the internal register, e.g., store them into one or more internal flip-flops or latches. The data stored in the register may then be used to generate one or more signals, which influence the behavior of one or more hardware blocks 110.

Figure 4:
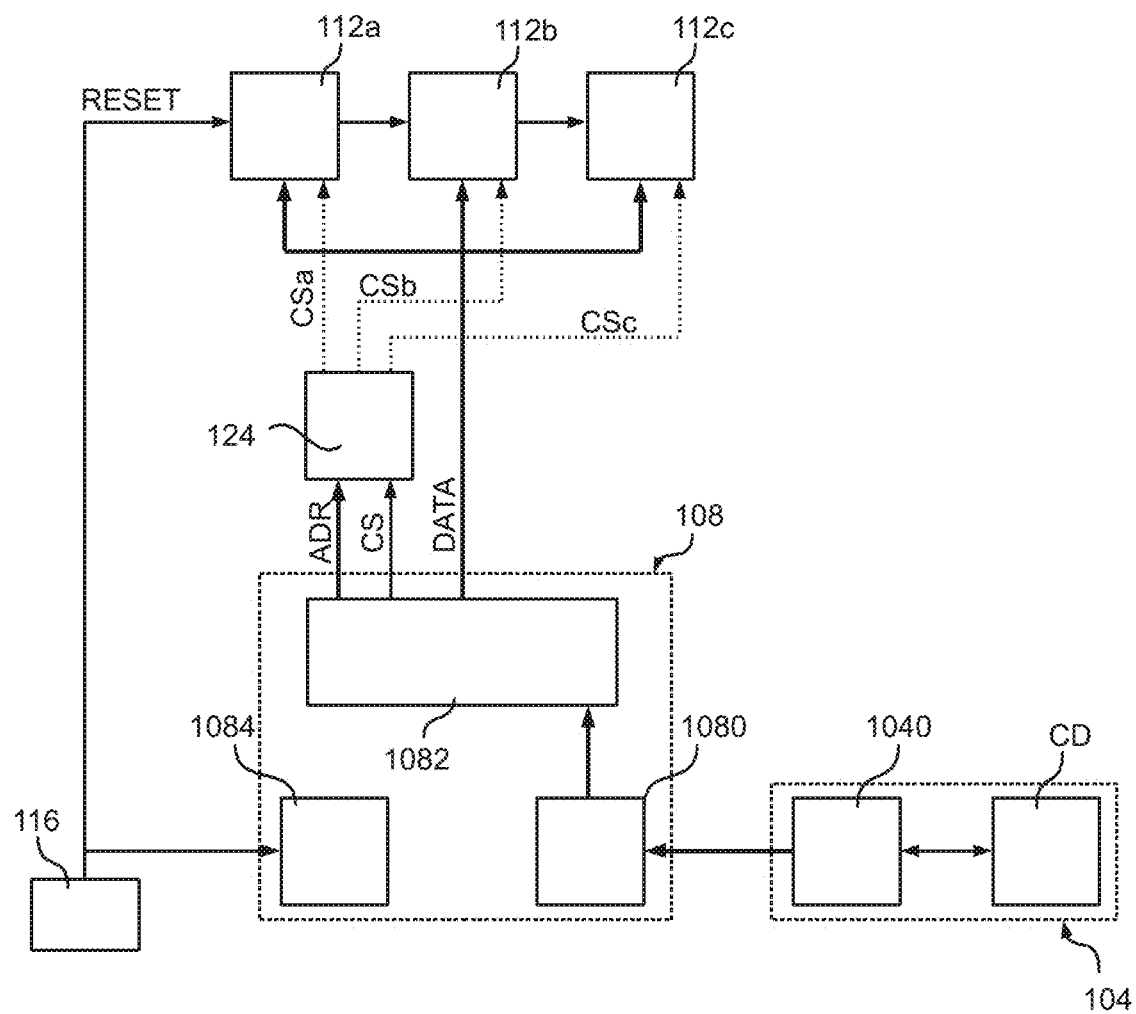
FIG. 4 shows an embodiment of a processing system comprising a configuration module and configuration data clients in accordance with the present disclosure.

FIG. 4 shows in this respect a possible embodiment of the communication between the configuration module 108 and the configuration data clients 112.

Specifically, also in this case, the processing system 10*a* comprises a configuration module 108 configured to read the configuration data CD from one or more non-volatile memories 104 (e.g., memories 104*a* and/or 104*b*) and a plurality of configuration data clients 112 configured to receive respective configuration data from the module 108 and distribute them among a plurality of blocks 110 (not shown) requiring configuration data. For example, as mentioned before, each configuration data client 112 may be associated univocally with a respective block 110. For example, in the embodiment considered, the processing system 10*a* comprises again three configuration data clients 112*a*, 112*b* and 112*c*.

In the embodiment considered, the configuration module 108 comprises a data read module 1080 configured to read the configuration data CD from the memory 104 and a dispatch module 1082 configured to transmit the configuration data to the configuration data clients 112.

As mentioned before, any communication may be used for communication between the dispatch module 1082 and the configuration data clients 112. For example, in various embodiments, the communication between the dispatch module 1082 and the configuration data clients 112 is based on data frames in accordance with a given format, called in the following Device Configuration Format (DCF). For example, in various embodiments, each data frame comprises two fields: the payload (i.e., the real data), called DCF Format payload, and possible additional data attributes used to identify the receiver of the data, called DCF Format attributes, wherein the receiver is one of the configuration data clients 112 representing a DCF client. For example, the data attributes may consist in 16 or 32 bits, wherein a given number of bits specify the address of one of the configuration data clients 112, and the payload may consist in 16 or 32 bits. For example, in various embodiments, the data read module 1080 is configured to read blocks of 64 bits from the memory 104, wherein the first 32 bits contain the data attributes (including the address of a configuration data client) and the second 32 bits contain the configuration data to be transmitted to the address specified in the data attributes.

As described before, each configuration data client/DCF client 112 may be a hardware module, usually comprising a combinational circuit configured to store the received data in an internal register implemented, e.g., with flip-flops/latches, thereby permitting to distribute, via one or more internal signals generated as a function of the data stored in the internal register, the configuration data received to various parts of the associate hardware block(s) 110. For example, as mentioned before, each configuration data client 112 may have associated a univocal address (i.e., univocal within each processing system 10*a*) and analyses the data transmitted by the dispatch module 1082 in order to determine whether the additional data attributes (DCF Format attributes) contain the address associated with the configuration data client 112.

In various embodiments, the module 108 may also comprises a state control module 1084 configured to manage the various configuration phases of the processing system 10*a*.

For example, in various embodiments, once the processing system 10*a* is switched-on, a reset module 116 of the processing system 10*a* may generate a reset signal RESET, which is used to perform a reset of the various components of the processing system 10*a*. For example, the reset signal RESET may correspond to a reset pulse of a given number of clock cycles, provided to the blocks 110 of the processing system 10*a*. For example, in the embodiment considered, the reset signal RESET may be used by the configuration data clients 112 in order to set the internal register to a given reset value.

Similarly, in response to a reset, the state control module 1084 may activate the configuration phase. Specifically, during the configuration phase, the data read module 1080 may read the configuration data CD from the memory 104 and the dispatch module 1082 may send the configuration data CD to the various configuration data clients 112, thereby overwriting the reset values.

For example, in various embodiments, the dispatch module 1082 may generate a data signal DATA having a given number of bits (corresponding to the bits of the payload) containing the configuration data to be transmitted to a given configuration data client 112 and further control signals for selecting the target configuration data client 112. For example, in the embodiment considered, the dispatch module 1082 generates also an address signal ADR containing the address of the target configuration data client 112 and optionally a chip select signal CS used to signal that the address signal ADR and the data signal DATA are valid.

For example, in various embodiments, the address signal ADR (and the chip select signal CS) may be provided to a decoder 124 configured to activate one of the configuration data clients 112 as a function of the address signal ADD. For example, in the embodiment considered, the decoder 124 may set a chip select signal CSa in order to indicate that the configuration data client 112*a* should read the data signal DATA when the address signal ADR corresponds to an address assigned to the configuration data client 112*a* (and the chip select signal CS is set). Similarly, the decoder 124 may set a chip select signal CSb in order to indicate that the configuration data client 112*b* should read the data signal DATA when the address signal ADR corresponds to an address assigned to the configuration data client 112*b* (and the chip select signal CS is set), etc.

Accordingly, as mentioned before, the configuration data CD may also comprise security configuration data used to activate or deactivate given security functions of the processing system 10*a*, such as the external access to a debug interface, the (read and/or write) access to given memory locations, etc.

Moreover, as mentioned in the foregoing the configuration data CD may comprise two sub-sets of configuration data: a first group of configuration data (e.g., calibration data) written by the producer of the processing system 10*a*, e.g., the chip manufacture, and a second group of configuration data written during a later stage, such as configuration data written by the firmware developer and/or a system integrator, such as the producer of an Engine Control Unit (ECU).

In various embodiments, these groups of configuration data are written to different areas of the memory(ies) 104, thereby permitting that these groups may be configured independently.

For example, in this case, the security configuration data included in the first group of configuration data may also permit to set the access rights to the memory locations in which the first group of configuration data are stored. For example, in this way, the first group of configuration data may not be overwritten, and/or the memory interface may inhibit a read access to the first group of configuration data (e.g., the processing unit 102).

Conversely, the security configuration data included in the second group of configuration data may be used to configure the behavior of the blocks 110 from a functional point of view, e.g., in order to enable or disable the debug interface, etc. Thus, also in this case, once the debug interface is deactivated, the second group of configuration data may not be overwritten or read.

Accordingly, in general, a relevant portion of the configuration data CD is not alterable anymore once given security configuration data have been stored in the non-volatile memory 104.

However, in many applications it would be desirable that the configuration data CD (e.g., the security configuration data used to enable given security functions) may be overwritten. For example, this may be useful both during the development stage and for diagnostic purposes.

For example, during the firmware development stage, it might be useful to temporarily activate one or more of the security features in order to test the processing system 10a. For example, usually different values for a permanent (i.e., not alterable) protection can be tested only on different devices, as each device will require different value to be programmed for the non-alterable, permanent protections. Unfortunately, the substitution of the processing system 10a with another may be an expensive operation, as the processing system 10a may be integrated in a more complex system, such as a full engine-control-unit, or even a whole system hosting it. Accordingly, it may be useful to permit a temporarily activation of the various security configurations, avoiding the need to permanently program the respective configuration data into the non-volatile memory 104.

Conversely, once the processing system 10a has been used in its application, it might be useful to temporarily deactivate or bypass one or more of the security features, e.g., in order to perform a diagnosis of the processing system.

Accordingly, in various embodiments, the processing system 10a, in particular the configuration module 108, is modified in order to permit an overwriting of at least part of the configuration data CD distributed to the configuration data clients 112. In various embodiments, the processing system 10a may also permit a reading of at least part of the configuration data CD distributed to the configuration data clients 112, e.g., in order to verify whether the configuration data are corrupted.

As will be described in the following, in various embodiments, in order to improve security, at least the overwriting of security configuration data may only be permitted once a given keyword has been provided. However, in general, all overwriting operations (and if supported also the reading operations) may be protected with at least one keyword, wherein also different keywords may be used for different operations (overwriting or reading) or even for different security functions (such as a limitation of the memory access rights or access to the debug interface).

Configuration data overwrite will now be described.

Figure 5:
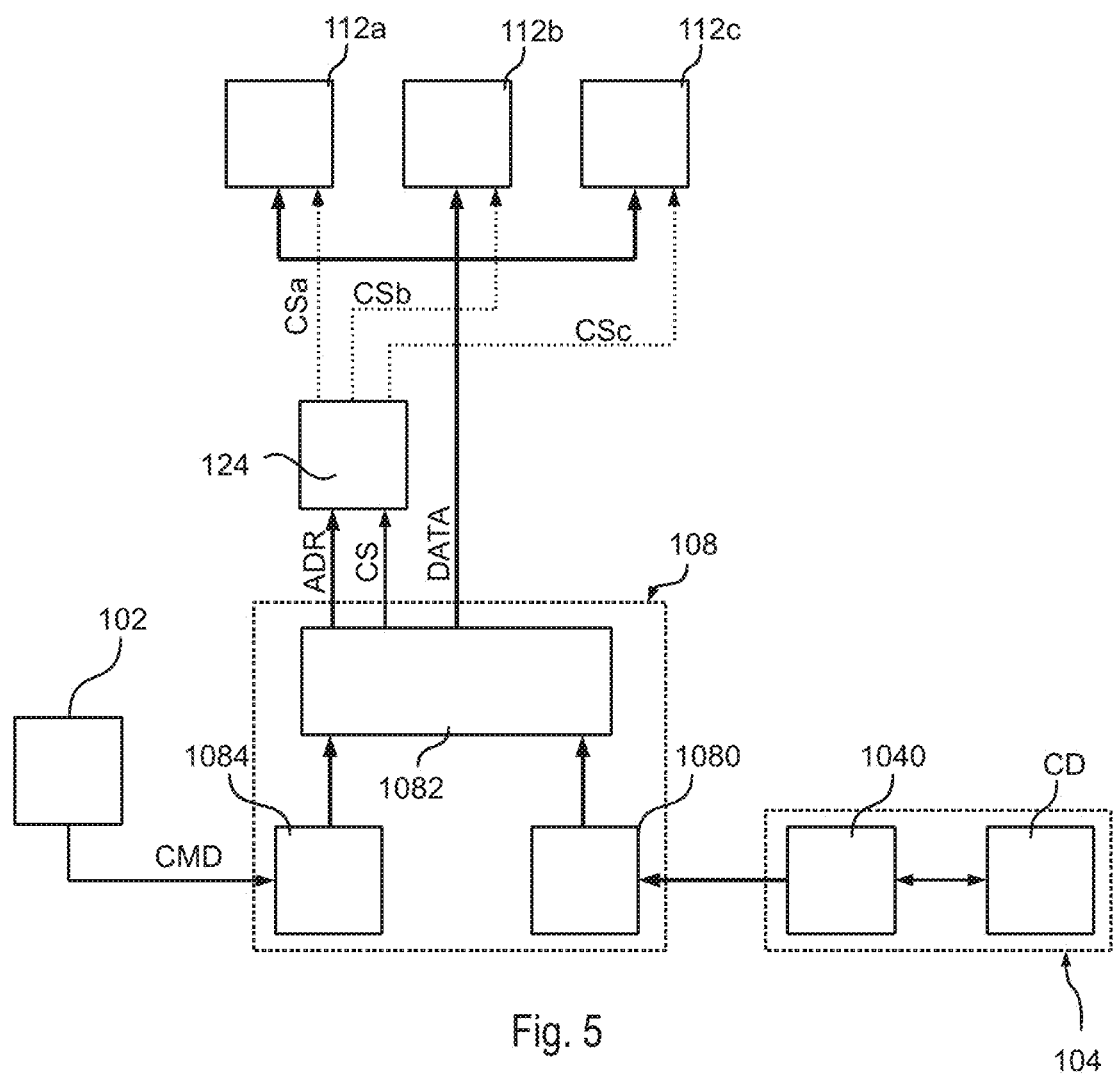
FIG. 5 shows an embodiment of a processing system comprising a configuration module enabling an overwriting of the configuration data sent to the configuration data clients.

FIG. 5 shows a first embodiment of a configuration module 108 configured to support an overwriting of at least part of the configuration data.

Specifically, in the embodiment considered, the state control module 1084 is modified in order to support a configuration data overwrite mode.

In the embodiment considered, the module 1084 is configured to receive a command CMD. Generally, the command CMD may be provided directly by a communication interface of the processing system 10a. Conversely, in the embodiment considered, the command CMD is generated by the processing unit 102 of the processing system 10a, e.g., the command CMD may be generated by means of software instructions executed by a microprocessor 102 of a microcontroller 10a.

Figure 6:
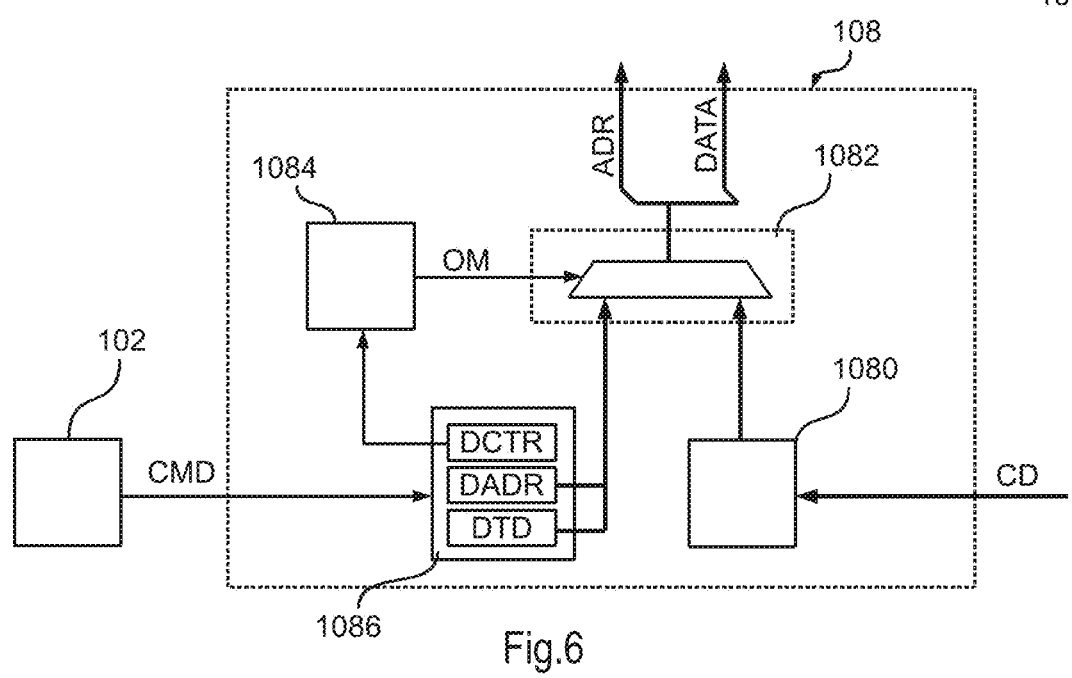
FIG. 6 shows an embodiment of the configuration module of FIG. 5.

For example, as shown in FIG. 6, the module 1084 may comprise one or more register 1086 addressable by the processing unit 102, so called special function registers of the processing system 10a. In this case, the processing unit 102 may write the content of the registers 1086 associated with the module 1084, thereby providing the command CMD to the module 1084.

For example, in various embodiments (see FIG. 6), the command CMD contains an address DADR of one of the configuration data clients 112 and updated configuration data DTD to be transmitted to the respective configuration data client 112. Generally, the command CMD may also comprise control information DCTR, which, e.g., may indicate that a new operation has to be performed. For example, in various embodiments, the address DADR, the data DTD and the optional control information DCTR are stored in different registers each having associated a respective address.

Accordingly, once the configuration module 108 has received the command CMD (e.g., once the address DADR and the data DTD are store in the register 1086), the configuration module 108 may send the configuration data included in the command CMD (i.e., the data DTD store in the register 1086) to the respective configuration data client 112.

For example, in the embodiment shown in FIG. 6, the address DADR and the data DTD are provided to the dispatch module 1082, which forwards the new configuration data to the configuration data client 112 indicated by the address DADR.

For example, for this purpose, the state control module 1084 may monitor the registers 1086, e.g., the control data DCTR, in order to determine whether new configuration data are available in the register 1086. In case new configuration are available in the register 1086, the state control module 1084 may generate an overwrite mode signal OM, which signals to the dispatch module 1082 that new configuration data should be transmitted to a configuration data client 112. For example, as schematically shown in FIG. 6, the dispatch module 1080 may transmit during the configuration phase the configuration data CD read by the data read module 1080. Conversely, when the signal OM indicates that the overwrite mode has been activated, the dispatch module 1082 may transmit the configuration data DTD stored in the register 1086, e.g., by setting the address signal ADR to the content of the register DADR and the data signal DATA to the content of the register DTD (and possibly generating the chip select signal CS).

Figure 7:
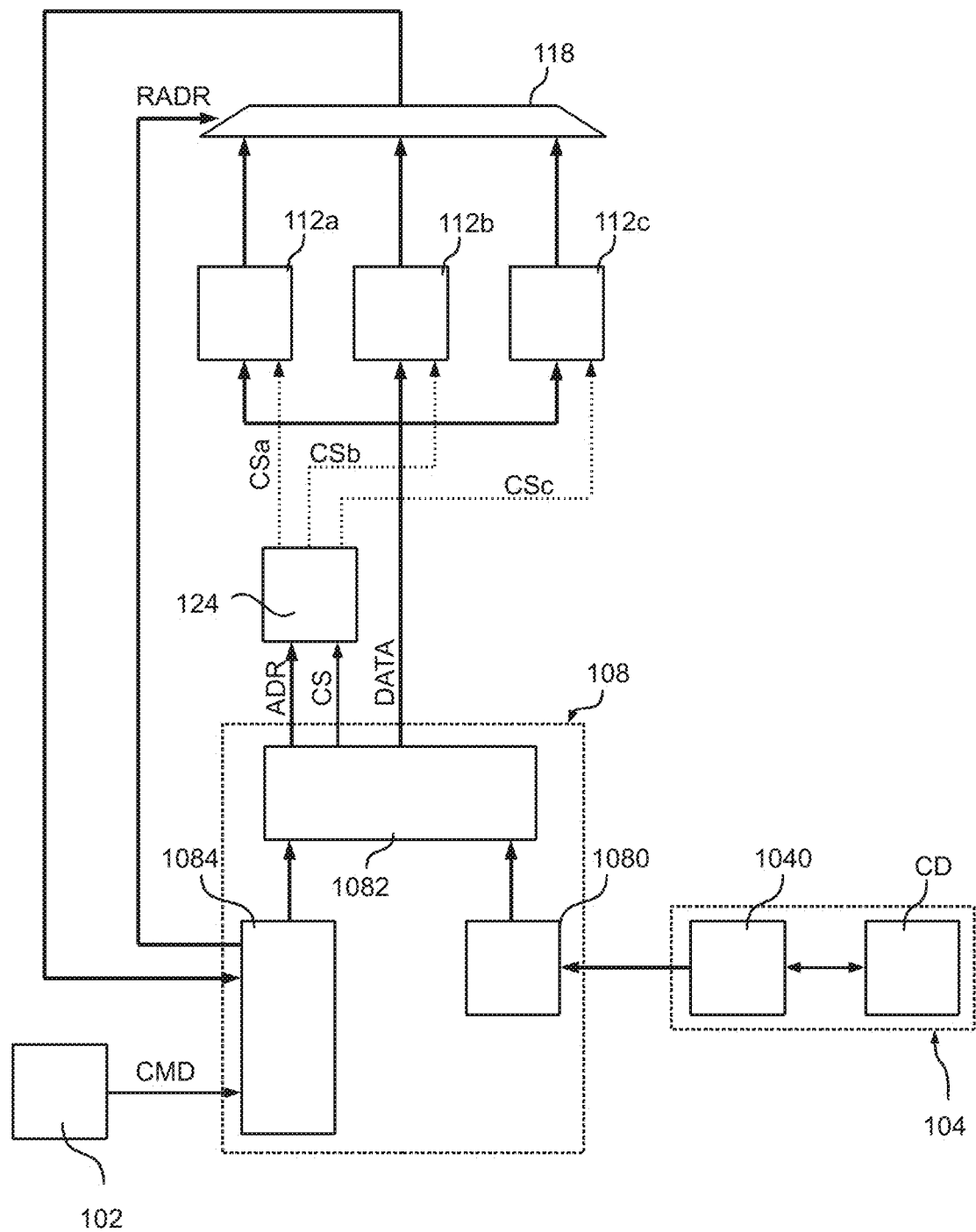
FIG. 7 shows an embodiment of a processing system comprising a configuration module enabling a reading of the configuration data sent to the configuration data clients.

As shown in FIG. 7, the configuration module 108 may also support a configuration data read mode. For example, the overwrite or the read mode may be indicated by the control data DCTR.

For example, in various embodiments, the address of the configuration data client 112 for the read operation is stored again in the register DADR and the configuration data read from the internal register of the configuration data client are stored in the register DTD. However, in general, also separate registers may be used for the read address and/or the data read.

For example, in the embodiment considered, the internal registers of the various configuration data clients 112 may be connected to a multiplexer 118. Specifically, the multiplexer 118 is configured to select the output of one of the configuration data clients 112 as a function of a read address signal RADR. Moreover, the output of the multiplexer (comprising the configuration data stored in configuration data client 112 indicated by the address RADR) is provided to the configuration module 108.

Accordingly, when the state control module 1084 detects a read operation, the state control module 1084 may store the signal at the output of the multiplexer 118 in the register DTD (see also FIG. 6). Generally, the read address signal RADR may always correspond to the data stored in the register DADR, or the state control module 1084 may set the signal RADR only when a read operation should be performed.

Accordingly, in the embodiments considered, the register 1086 is accessible via the processing unit 102, e.g., via the software executed by a microprocessor. Moreover, in the embodiment considered, the register 1086 comprises the register DADR used to store the address of a target configuration data client 112, the register DTD used to store data to be transmitted to or read from the configuration data client 112, and the register DCTR used to control the read or write operation.

Accordingly, in various embodiments, the register DTD has a number of bits corresponding to the number of bits of the data signal DATA, i.e., the bits of the DCF Format payload, and the register DADR has a number of bits corresponding at least to the number of bits of the address signal ADDR. For example, both registers may have 32 bits.

Conversely, in various embodiments, the register DCTR permits to specify a new read or write operation. For example, in various embodiments, the register DCTR comprises three bits, wherein bit 0 is used to signal the start of a new access to a configuration data client;

bit 1 is used to select whether the access shall be a read or a write operation; and bit 2 is used to activate the access operation.

Figure 8A:
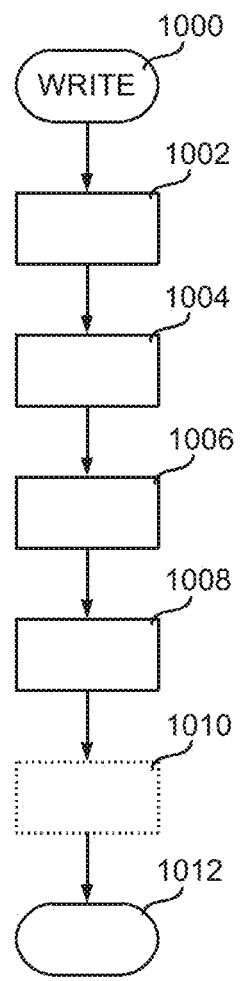
FIGS. 8*a* and 8*b* show embodiments for overwriting and reading configuration data in the embodiments shown in FIGS. 5 to 7.
Figure 8B:
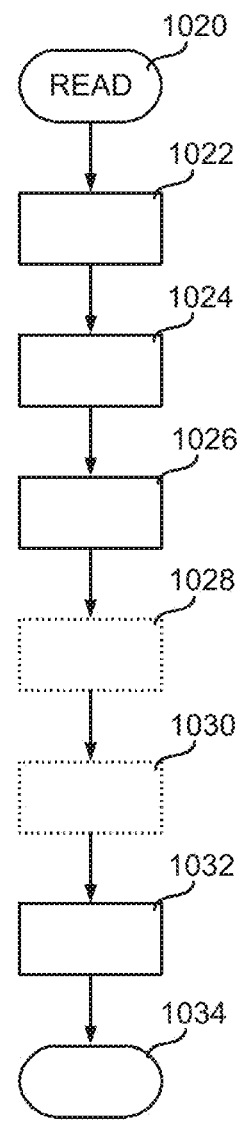

For example, FIGS. 8a and 8b show embodiments of the operations executed by the processing unit 102, e.g., via software instructions, in order to perform a write or read operation of configuration data, respectively.

For example, as shown in FIG. 8a (write operation), after a start step 1000, the processing unit 102 sets at a step 1002 the bit 0 of the register DCTR (start of new access) and sets the bit 1 of the register DCTR (write access). Next, the processing unit 102 writes at a step 1004 the address of the target configuration data client 112 to the register DADR and at a step 1006 the new configuration data to the register DTD. Finally, the processing unit 102 sets at a step 1008 the bit 2 of the register DCTR (execute operation) and the procedure terminates at a stop step 1012.

Accordingly, in the embodiment considered, the state control module 1084 may determine whether the bit 2 of the register DCTR has been set (and possibly also bit 0 of the register DCTR) in order to detect whether a new access has to be performed. Specifically, a write access is performed because the bit 1 is set. Accordingly, once the processing unit 102 has set the bit 2 of the register DCTR at the step 1008, the state control module 1084 generates the overwrite mode signal OM and the dispatch module 1082 sends the content of the register DTD to the configuration data client 112 with the address stored in the register DADR.

Generally, once the write operation has been executed, the processing unit 102 may also clear at a step 1010 one or more bits of the register DCTR. The step 1010 is purely optional because the register DCTR may also be cleared by the module 1084.

Similarly, as shown in FIG. 8b (read operation), after a start step 1020, the processing unit 102 sets at a step 1022 the bit 0 of the register DCTR (start of new access) and clears the bit 1 of the register DCTR (read access). Next, the processing unit 102 writes at a step 1024 the address of the target configuration data client 112 to the register DADR and sets at a step 1026 the bit 2 of the register DCTR (execute operation).

Accordingly, also in this case, the state control module 1084 may determine whether the bit 2 of the register DCTR has been set (and possibly also bit 0 of the register DCTR) in order to detect whether a new access has to be performed. Specifically, a read access is performed, because the bit 1 is cleared. Accordingly, once the processing unit 102 has set the bit 2 of the register DCTR at the step 1026, the state control module 1084 may request the data from the configuration data client 112 with the address stored in the register DADR, and store the data read in the register DTD.

According, once the configuration module 108 has read the configuration data from the configuration data client 112 and stored in the register DTD, the processing unit may read at a step 1032 the content of the register DTD and the procedure terminates at a stop step 1034. Generally, in order to give the configuration module 108 time to execute the read operation, the processing unit 102 may perform at a step 1028 one or more operations, including also dummy operations or (useless) read accesses to registers. Generally, once the read operation has been executed (e.g., after the step 1026 or 1028), the processing unit 102 may also clear at a step 1030 one or more bits of the register DCTR. The step 1030 is purely optional because the register DCTR may also be cleared by the module 1084.

Accordingly, e.g., by following the steps shown in FIGS. 8a and 8b, the processing unit 102 (e.g., via software instructions) may read/write configuration data from/to one or more of the configuration data clients 112. For example, a write operation may be important to be able to temporarily test different configurations of the configuration data clients 112, including also the security configuration data, thereby permitting a reduction of the development and testing phases. For example, a conventional debug interface may not be used for this purpose, because, once deactivated, the debug interface cannot be used any more to interact with the processing system 10a. Conversely, a read operation may be important to analyze whether a certain configuration data client 112 contains the expected data (for example, in the case of a failure analysis).

In the embodiments considered with respect to FIGS. 5 to 7, the configuration module 108 permits that the processing unit 102 may write directly the command CMD into the registers 1086, without any security verification. However, this does not represent per se a security problem. In fact, the processing unit 102 may indeed receive the command CMD via one of the communication interfaces of the processing system 10a, e.g., via a CAN bus. Accordingly, the command received via the communication interface may comprise also a keyword/password, and the processing unit 102 may be configured to determine whether the keyword included in the command received corresponds to a reference keyword. Similarly, the command CMD may also be transmitted in encrypted form to the processing unit 102 and the processing unit 102 may decrypt the command (e.g., by using a symmetric or asymmetric encryption algorithm). Accordingly, in general, the processing unit 102 may verify whether indeed the command received via the communication interface should be forwarded to the configuration module 108.

In various embodiments, it may however be desirable to limit the read and/or write access provided by the configuration module 108. In fact, from a security point of view, the protection of the register interface 1086 should not just rely on higher layer protection mechanism (e.g., CAN or encryption). Accordingly, in various embodiments, the configuration module 108 comprises also hardware protections.

Figure 9:
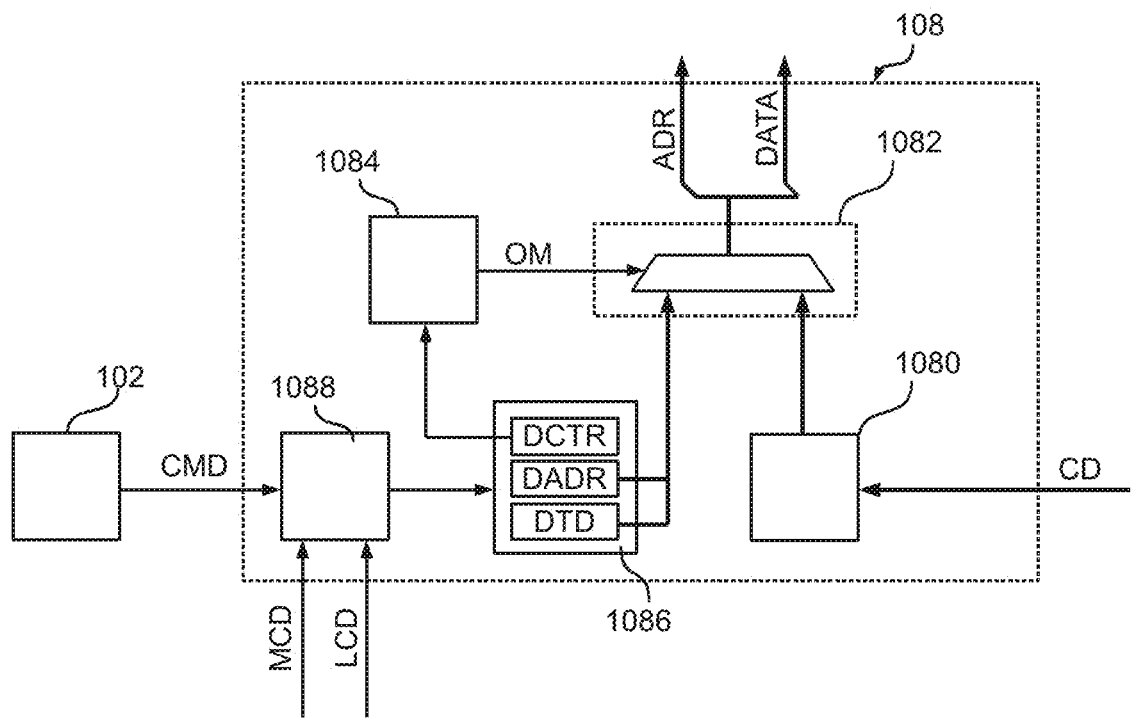
FIG. 9 shows an embodiment of a configuration module comprising an access control module.

For example, FIG. 9 shows an embodiment of a configuration module 108 comprising an access control module 1088, which selectively enables access to the register 1086, i.e., enables or inhibits the forwarding of the command CMD to the register 1086. Generally, the access control module 1088 may enable or inhibit the execution of the read or write access also in different manner, e.g., by providing a signal to the state control module 1084, and the state control module 1084 may switch to the overwrite mode or read mode only when the access control module 1088 indicates that the access is granted.

For example, in various embodiments, the hardware access control module 1088 may receive at input one or more configuration data, including, e.g., mode configuration data MCD and/or life cycle data LCD. For example, in various embodiments, the mode configuration data MCD are stored in the non-volatile memory 104.

Figure 11:
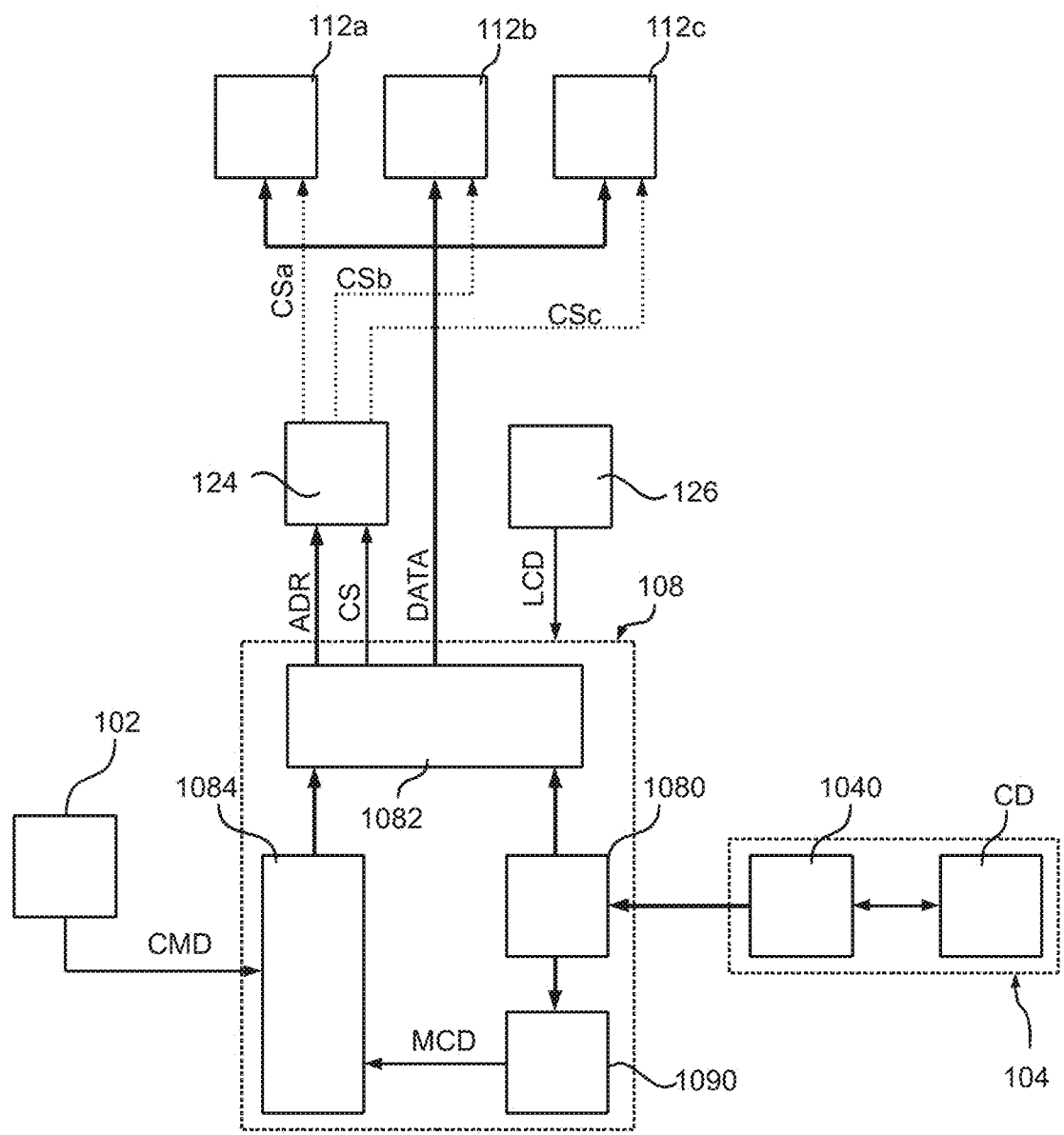
FIGS. 11 and 12 show further embodiments of processing systems.

For example, FIG. 11 shows an embodiment, in which the mode configuration data MCD are stored at one or more fixed memory locations in the memory 104. In this case, the module 108 may read the mode configuration data MCD via the data read module 1080 and store them in an internal register logo. Similarly, also in case the mode configuration data MCD are stored together with the configuration data CD, the module 108 may extract the mode configuration data MCD and store them in the internal register 1090.

Figure 12:
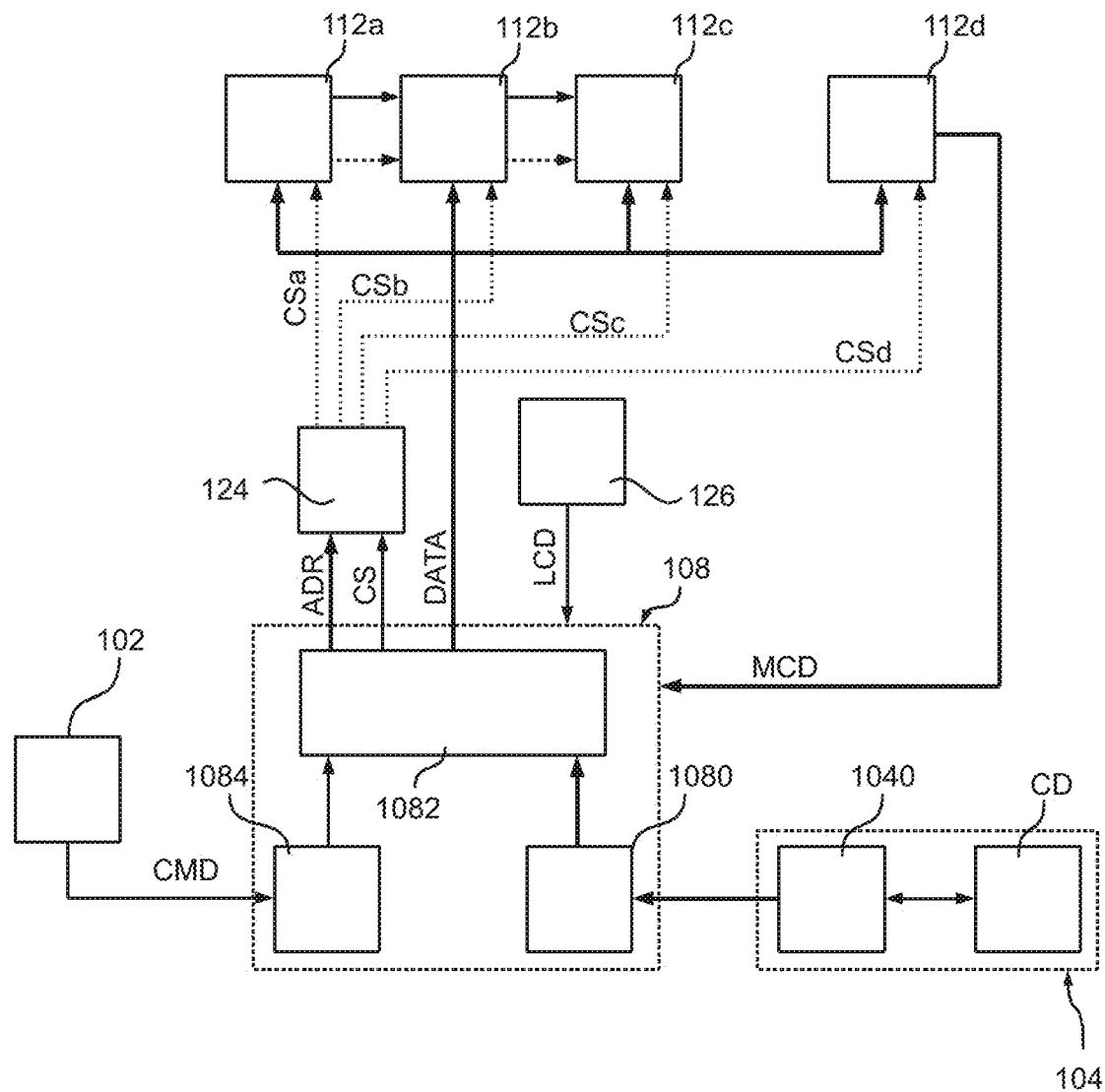

Conversely, FIG. 12 shows an embodiment, in which an additional configuration data client 112*d* is used. Generally, the previous description of the configuration data clients 112 applies also to this client 112*d*. For example, the configuration data client 112*d* is configured to store in an internal register during a reset state a given reset value and overwrite the reset values by storing the data received from the module 108. Moreover, when using a bus system, the configuration data client 112*d* may have associated a respective address ADR. For example, in the embodiment considered, the decoder 124 may generate a chip select signal CSd when the address ADR provided by the module 108 corresponds to the address associated with the configuration data client 112*d*.

Accordingly, in the embodiment considered, the configuration module 108, in particular the dispatch module 1082, distributes the configuration data CD read from the memory 104 to the various configuration data clients 112, without knowing that these data include also the mode configuration data MCD. In the embodiment considered, the configuration data client 112*d* represents thus the configuration data client associated with the configuration module 108, wherein the configuration data client 112*d* provides the mode configuration data MCD to the configuration module 108, e.g., the access control module 1088. Accordingly, in the embodiment considered, the module 108 passes the mode configuration data MCD read from the memory 104 to the configuration data client 112*d* and receives from the same the stored configuration data, i.e., the mode configuration data MCD.

Accordingly, in various embodiments, the mode configuration data MCD may be written by the firmware developer of the processing system. For example, in various embodiments, the mode configuration data MCD permit to specify:

overwrite mode is enabled; or overwrite mode is disabled (which may correspond to the default value).

Conversely, the life cycle data LCD indicate the life cycle of the product. The life cycle is a permanent signature written into a non-volatile memory, which determines the stage of the processing system 10*a* during its life-time. For example, the life cycle may be encoded with a bit sequence. In various embodiments, this bit sequence is stored in a separate non-volatile memory 126 (see e.g., FIG. 10), preferably a one-time programmable memory. In general, the life cycle data LCD may also be stored at reserved memory locations of the memory 104.

For example, in various embodiments, the bit sequence LCD stored in the memory 126 may indicate one of the following stages:

"production" (LC1), when the processing system 10*a*, e.g., a micro-controller, is in the chip fabric;

"customer delivery" (LC2), when the processing system 10*a* has been shipped to the 1st tier customer (e.g., a producer of an engine control unit);

"OEM production" (LC3), when the device has been shipped to a next-level customer (e.g., a car maker);

"in field" (LC4), when the device is installed in the final product (e.g., in a car sold in the market);

"failure analysis" (LC5), when the device is shipped back to producer of the processing system 10*a* or the software developer for diagnostic purposes.

In various embodiments, the life cycle data LCD is written such that once a certain stage is reached, it is not possible to revert it back to a previous stage, i.e., the life cycle can only advance. For example, this may be implemented with a one-hot encoding in which a fuse is burned each time a given stage has been reached. For example, the advancing of the life cycle to the next stage may be done by the entity who owns the device in the current life cycle stage (e.g., chip producer will advance the life cycle when it is shipped to the customer delivery stage; the 1st tier customer will advance the life cycle when it is shipped to the OEM production stage, etc.).

The inventor has observed that, from a security point of view, it may be advantageous that the read and/or write access to the configuration data depends also on the life cycle of the product. For example, during the production stage (LC1) and firmware development stage (LC2) read and write access to the configuration data may be permitted. Conversely, once the programmed processing unit 10*a* has been delivered (LC3 and LC4) access to the configuration data should be inhibited. Finally, during a failure analysis (LC5), access to the configuration data should (at least in part) be possible again.

In various embodiments, the access control module 1088 is thus configured to enable access to the configuration data as a function of both the mode configuration data MCD (access enabled or disabled) and the life cycle data LCD (LC1 . . . LC5). For example, the following table provides an overview of an embodiment of the access control enforced by the access control module 1088:

| LCD | MCD | ACCESS |
| --- | --- | --- |
| LC1 | — | ENABLED |
| LC2 | ENABLED | ENABLED |
| LC2 | DISABLED | DISABLED |
| LC3, LC4 | — | DISABLED |

| LCD | MCD | ACCESS |
| --- | --- | --- |
| LC5 | ENABLED | ENABLED |
| LC5 | DISABLED | DISABLED |

Figure 10:
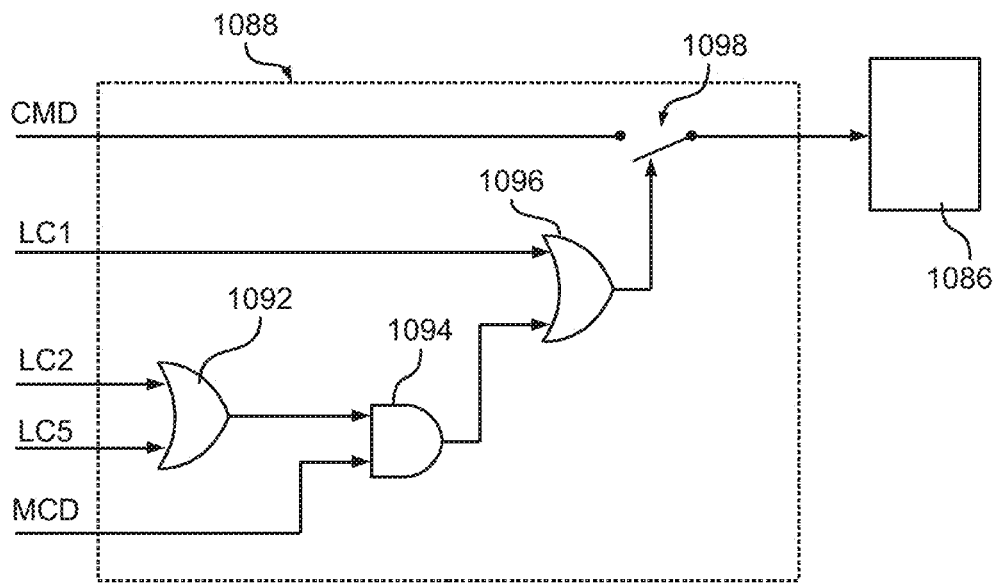
FIG. 10 shows an embodiment of the access control module of FIG. 9.

For example, FIG. 10 shows an embodiment of the access control module 1088 implementing the above access rights.

Specifically, in the embodiment considered, the access control module 1088 comprises circuitry for enabling or disabling access to the configuration data. For example, in FIG. 10 is shown schematically a switch 1098 configured to selectively inhibit the forwarding of the command CMD to the register 1086.

In the embodiment considered, the access module 1088 receives at input three control signals LC1, LC2 and LC5 indicating whether the life cycle is set to the production stage (LC1), firmware development stage (LC2) or failure analysis stage (LC5), respectively.

In the embodiment considered, when the signals LC2 or LC5 are set, access to the configuration data should be enabled or disabled based on the mode control data MCD. For example, in Figure to this is implemented with an OR gate 1092 (receiving at input the signal LC2 and LC5) and an AND gate 1094 (receiving at input the signal at the output of the OR gate 1092 and the signal MCD). Conversely, when the signal LC1 is set, access to the configuration data is always enabled. For example, in Figure to, this is implemented with an OR gate 1096 receiving at input the signal at the output of the AND gate 1094 and the signal LC1, wherein the signal at the output of the OR gate 1096 is used to enable or disable access to the configuration data, e.g., by enabling or disabling access to the register 1086, e.g., via the switch 1098.

In various embodiments, the access control module 1088 may also verify one or more further conditions.

For example, in various embodiments the access control module 1088 may monitor a pin, usually indicated as test pin, in order to decide whether the access may be enabled or not. For example, access may be disabled when the test pin is set to the logic level low, while access may by enabled as a function of the mode configuration data MCD and/or the life cycle data LCD (as described in the foregoing) when the test pin is set to the logic level high.

The access control module 1088 may also take into account the type of configuration data to be accessed. For example, access to security related configuration data (such as encryption keys) may only be possible during the stages LC1 and LC2 (possibly taking into account the mode control data MCD), while in the remaining stages (including also the stage LC5), access may be inhibited. Accordingly, when the device is in the failure analysis stage (LC5) certain configuration data may be read and/or written while other cannot, wherein the distinction may be based on the fact whether the configuration data are security relevant or not. The classification of the configuration data as security relevant or not-security relevant is evidently device dependent. For example, this may be implemented by using two instances of configuration modules 108: a first configuration module 108 for the security relevant configuration data (i.e., a first set of configuration data) and a second configuration module 108 for the not-security relevant configuration data (i.e., a second set of configuration data). In this case, the access control module 1088 of the first configuration module 108 may also block the access when the life cycle data LCD indicate the stage LC5 (e.g., this may be obtained by removing the input LC5 from FIG. 10).

Generally, also a single configuration module 108 may be used. In this case, before executing an access, the configuration module 108 may:

a) verify whether the device is in the failure analysis stage (LC5), and b) in case the device is in the failure analysis stage (LC5), determine whether the target address stored in the register DADR corresponds to the address of a configuration data client 112 storing security relevant configuration data.

In fact, in general the access control module 1088 may also enable or disable access to the configuration data as a function of the address of the target configuration data client 112.

Figure 13:
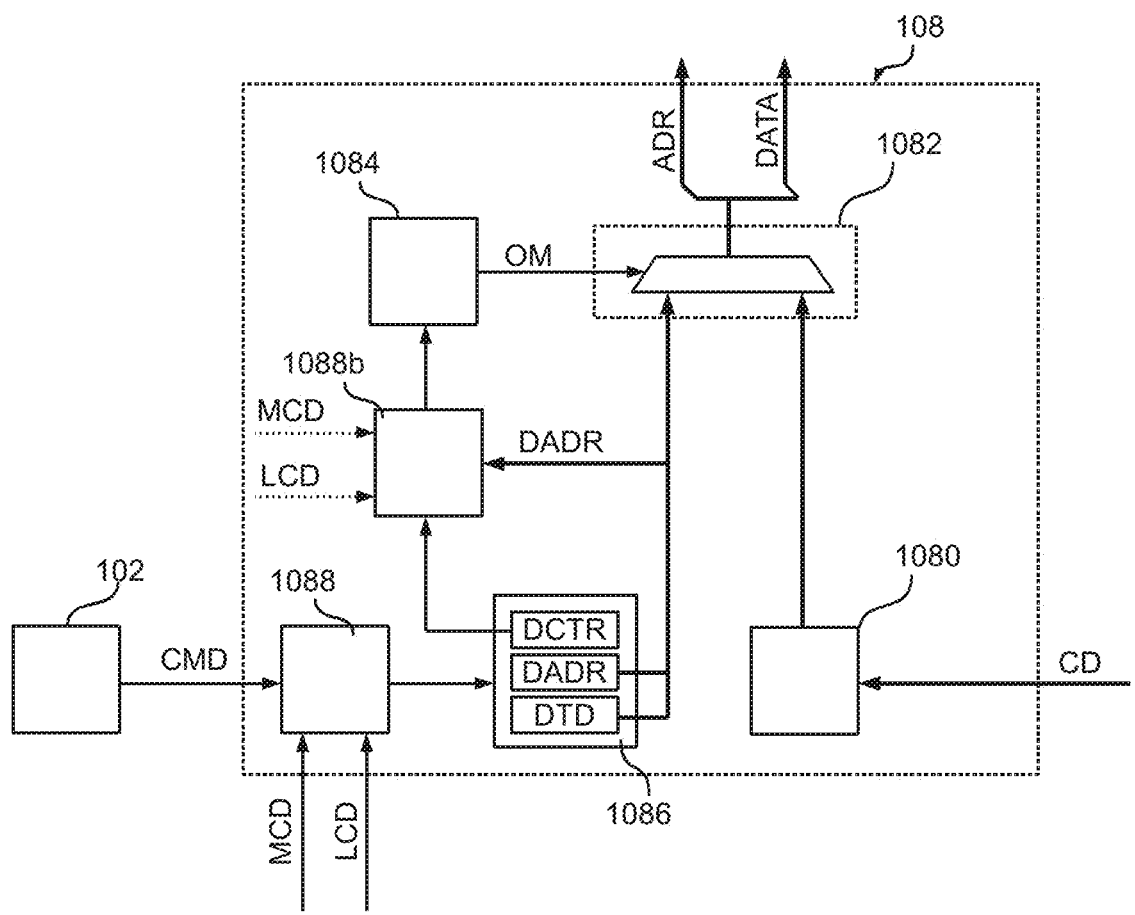
FIG. 13 shows a further embodiment of a configuration module comprising an access control module.

For example, FIG. 13 shows an embodiment in which the configuration module 108 comprises a second access control module 1088b. Generally, this module 1088b may be used alone or in combination with the access control module 1088 described in the foregoing, and may also be integrated in the access control module 1088, thereby implementing a single access control module.

In the embodiment considered, the access control module 1088b is configured to enable or disable access as a function of the address stored in the register DADR. Generally, as will be described in the following, also the access control module 1088b may take into account the life cycle data LCD and/or the mode control data MCD.

Figure 14:
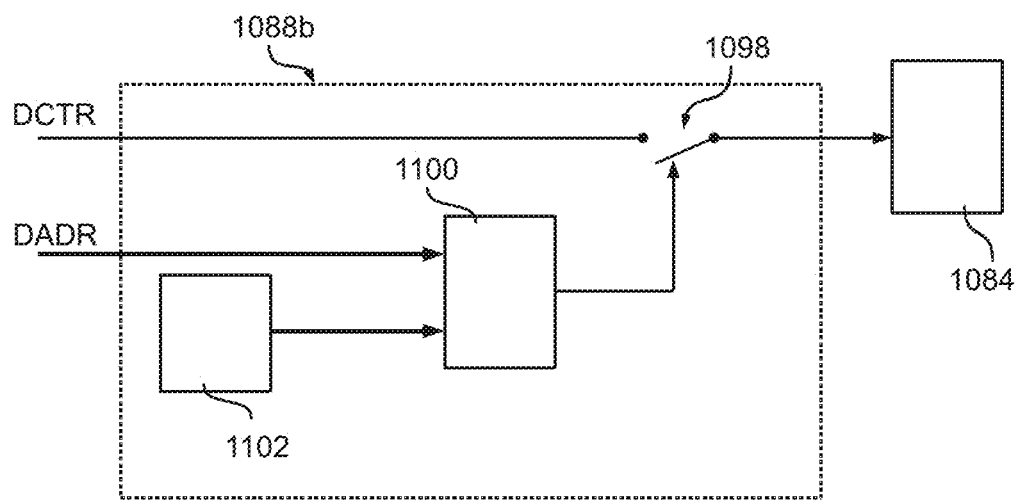
FIG. 14 shows an embodiment of the access control module of FIG. 13.

For example, as shown in FIG. 14, the access control module 1088b may be configured to enable the executing of a read or write access operation to the configuration data as a function of the address DARD. In FIG. 14 this is schematically shown by means of a switch 1098 which is configured to selectively forward the control data DCTR to the state control module 1084. However, the access control module 1088b may also provide directly an access control signal (enabling or disabling the access) to the state control module 1084.

For example, in various embodiments, the access control module 1088b comprises a comparator circuit 1100 configured to compare the address DADR with one or more reference addresses 1102. Generally, the reference address 1102 may be in the form of a white list, i.e., access is granted when the address DADR is stored in the list 1102 or the reference address 1102 may be in the form of a black list, i.e., access is inhibited when the address DADR is stored in the list 1102. In various embodiments, the reference addresses may be hard-wired and/or provided with the mode configuration data MCD.

As mentioned before, the access control module 1088b may also take into account the life cycle data LCD and/or the mode control data MCD. For example, in particular when the access control module 1088 is missing and the processing unit 102 may always access the register 1086, the access control module 1088b may be configured to enable or disable access in line with the description of the access control module 1088, e.g.:

enable access always when the life cycle data LCD indicate the life cycle LC1;

enable access as a function of the mode control data MCD when the life cycle data LCD indicate the life cycle LC2;

disable access when the life cycle data LCD indicate the life cycle LC3 or LC4; and enable access as a function of the mode control data MCD and the address DADR when the life cycle data LCD indicate the life cycle LC5.

Accordingly, in various embodiments, access to one or more configuration data clients 112 (e.g., those storing security-relevant data) may be inhibited selectively, e.g., when the life cycle is set to failure analysis stage. The reason to give this flexibility during the failure analysis is again a trade-off between testability and security: it may be accepted that some configuration data can be read out or altered on-the-fly via software to enable the possibility to make some specific test, but it is not allowed to change the programmed security configuration and/or read it back.

Accordingly, the solutions described in the foregoing improve the flexibility of testing and firmware development for the security architecture. In various embodiments, during the initial testing and development stages (LC1 and LC2) it is possible to simulate the behavior of different configuration scenarios stages without the need to physically use different units for each test or development scenario. In various embodiments, the solution adopted does not compromise the overall security as it allows the feature only for those life cycle stages where the security protections are less relevant. In addition, in various embodiments, the content stored by the configuration data clients may be read, which is an important feature during the failure analysis stage.

Similarly, also the operation of the blocks 110 of the processing system 10*a* may vary as a function of the configuration data CD and/or the life cycle data LCD. In fact, also the life cycle data LCD represent some kind of configuration data, which may be used to enable or disable (or generally control) given functions of a block 110.

However, a fundamental difference exists between the configuration data CD and the life cycle data LCD. Specifically, the processing system 10*a* is configured in order to permit only an advancing of the life cycle as encoded by the life cycle data LCD. For this reason, the life cycle data LCD may be stored in a one-time programmable memory 126, e.g., implemented with fuses. Accordingly, one or more bits of the one-time programmable memory 126 may be written, e.g., burned, in order to advance the life cycle. However, a written bit may not be erased anymore and accordingly, the life cycle may only advance and not return. Generally, a one-time programmable memory 126 may also be implemented with other non-volatile memories, including also physical memories which are re-programmable/erasable, such as flash memories, e.g., the memory 104 (i.e., 104*a* or 104*b*). In this case, the memory controller, e.g., the controller 1040, may be configured to inhibit an erase operation of the memory area, e.g., the respective flash page, containing the life cycle data LCD.

For example, usually the bits of a one-time programmable memory or an erased non-volatile memory are set to a given logic value, e.g., "1", and a single bit of the memory location may be written by setting the respective bit to the opposed logic value, e.g., "0". In case, single bit operations are not permitted, the other bits of the memory location may simply be set to the erased logic value, e.g., to "1". For example, assuming a memory location with 8 bits, the bit sequence ox7F will write only the most significant bit to "0" and the bit sequence oxFE will only write the least significant bit to "0".

Conversely, the configuration data CD are usually written to reprogrammable non-volatile memories 104, such as flash memories. For example, the configuration data CD may be reprogrammed, because the memory area of the memory 104 containing the configuration data CD may be erased, i.e., the configuration data CD are written to erased memory locations. However, as mentioned before, by activating given security features of the processing units, the capability to reprogram the configuration data CD may also be deactivated, e.g., by deactivating the debug interface or limiting the write/erase access to the memory 104. Conversely, as mentioned before, the processing system 10*a* is configured to generally inhibit an erase operation of the memory area containing the life cycle data LCD. Moreover, while permitting write operations for advancing the life cycle data LCD, write operation for reversing the life cycle data LCD are inhibited.

Accordingly, similar to the configuration data CD, it may be useful that also the life cycle data LCD may be overwritten temporarily, e.g., in order to test the behavior of the processing system 10*a* during the various life cycle stages. In fact, once programmed, it is generally impossible to revert the programming of the life cycle data LCD, because the life cycle may only advance but not return to a previous stage.

Life cycle data overwrite will now be described.

For example, as mentioned before, in various embodiments, the bit sequence LCD may indicate one of the following stages:

"production" (LC1), when the processing system 10*a*, e.g., a micro-controller, is in the chip fabric;

"customer delivery" (LC2), when the processing system 10*a* has been shipped to the 1st tier customer (e.g., a producer of an engine control unit);

"OEM production" (LC3), when the device has been shipped to a next-level customer (e.g., a car maker);

"in field" (LC4), when the device is installed in the final product (e.g., in a car sold in the market); and "failure analysis" (LC5), when the device is shipped back to producer of the processing system 10*a* or the software developer for diagnostic purposes.

For example, each of these stages may be identified with a given bit sequence, e.g., the bit sequence "1111" may indicate that the production stage, the bit sequence "0111" may indicate the customer delivery stage, the bit sequence "0011" may indicate that the OEM production stage, etc. Generally, the bit sequences may also be longer and also stored in a plurality of memory locations. Accordingly, in general, the encoding of the life cycle data LCD ensures that the life cycle can only advance to the next stage, i.e., it can never be reverted to an early stage, and advancing the life cycle to the next stage is done by the entity who owns the processing system 10*a* in the current life cycle stage by writing one or more bits of the life cycle data LCD.

As mentioned before, the life cycle data LCD are written to memory areas of a non-volatile memory, e.g., the memory 104 or 126, that are not erasable. Similar to the configuration data CD, also the life cycle data LCD are read and possibly decoded during the reset phase of the processing system 10*a* (i.e., before any internal blocks are activated, e.g., before the processing unit 102 starts executing its software) and distributed to blocks, e.g., the configuration module 108 and blocks 110, configured to change operation as a function of the life cycle data LCD.

Accordingly, in various embodiments, the configuration data CD are distributed to specific block 110, e.g., via the configuration data clients 112 described in the foregoing. For example, this may be achieved by associating each block 110 one or more configuration data clients 112, which provide the configuration data received only to the respective block 110. Conversely, the life cycle data LCD may be global and distributed to a plurality of blocks.

As mentioned before, the blocks 110 may use the life cycle data LCD and/or the configuration data CD, e.g., to enable or disable certain functions, such as security features. For example, once the life cycle data LCD indicate the in-field stage, the debug interface may be deactivated automatically. For example, such blocks 110 may comprise a combinational circuit configured to generate an enablement signal used to enable or disable a given security feature as a function of the life cycle data LCD and the configuration data CD.

For example, in various embodiments, depending on the current life cycle as indicated by the life cycle data LCD and the configuration data CD, each security features of the processing system 10a can be in one of the following states:

a) the life cycle data LCD indicate that the protection is disabled independently of the configuration data CD;

b) the life cycle data LCD indicate that the protection may be enabled selectively and the configuration data CD indicate that the protections is disabled;

c) the life cycle data LCD indicate that the protection may be enabled selectively and the configuration data indicate that the protections is enabled; and d) the life cycle data LCD indicate that the protection is enabled independently of the configuration data CD.

Generally, the blocks do not necessarily have to support all four states, e.g., some blocks 110 may support only two or more of the above states, such as the states a), b) and c).

For example, during the production stage, the processing system 10a should be tested and defect devices should be discarded. In this stage, the processing system 10a is not supposed to be operated in any customer application and there is no need to have any security feature activated. For this reason, in various embodiments, during the production stage all blocks having security features, i.e., features limiting access to given functions, should disable the respective feature (state a).

Conversely, during the customer delivery stage, the firmware developer should be able to test the processing system 10a. Thus, in various embodiments, during this stage most security features are selectively enablable as a function of the configuration data CD (state b or c).

However, some security features may already be enabled automatically in this stage. For example, this may be useful, when the producer of the processing system already stores some data into the non-volatile memory 104, such as a first set of configuration data (e.g., calibration data), and/or secret data, such as encryption keys. In this case, write and possibly also read access to the respective memory areas should be inhibited. Accordingly, such an access limitation to the respective memory locations may be activated always once the processing system leaved the production stage (state d). For example, the memory controller 1040 may be configured to permit write and read access to such memory locations of the memory 104 containing data written by the producer only during the production stage.

Once the firmware has been developed and stored into the memory 104a, the life cycle data LCD may be updated in order to advance the product to an optional OEM production stage. Usually, during this stage, a following 1st tier customer may embed the processing system 10a into a more complex system, such as an engine control unit. Moreover, the 1st tier producer may also adapt or develop part of the firmware, e.g., develop part of the application, and/or write some configuration/calibration data to be used by the firmware developed in the previous stage. Accordingly, when the engine control unit is ready to be shipped, the 1st tier customer will again advance the life cycle by writing the data LCD.

Also in this case, access to the firmware developed during the previous stage (customer delivery stage) should be limited. For example, write and possibly also read access to further memory areas should be inhibited. Similarly, once the life cycle advances, write and possibly also read access to the memory areas containing the portion of the firmware developed by and/or the configuration data written by the 1st tier customer may be limited. Similarly, also the possibility to connect a debugger may be limited. For example, these protections might be enabled during the 1st tier production stage, when the processing system 10a is embedded, e.g., into an engine control unit.

Accordingly, when the next life cycle stage (in field) is activated, most security features should be activated, e.g., in order to disable the debug interface and/or access to the memory 104 of the processing system 10a. For example, this stage corresponds to the situation where the processing system 10a is used in a commercial car, sold and driven. Generally, such security features may be activated automatically (state d) or selectively (stage b or c).

Finally, the failure analysis stage serves to analyze processing systems 10a exhibition an abnormal behavior. Accordingly, in this stage, some security features should be disabled again. Generally, such security features may be deactivated automatically (state a) or selectively (stage b or c). Accordingly, this stage re-opens one or more "doors" (for example, the possibility to connect a debugger to run some software test), but keeps most of the security scenario unchanged. In various embodiments, the failure analysis stage may however also deactivate one or more functions of the processing system 10a in order to render impossible the re-use of the processing system 10a. For example, some communication interfaces (e.g., the CAN interface) may be deactivated, such that the processing system 10 is unable to communicate with other processing systems.

Accordingly, in various embodiments, one or more blocks 110 of the processing system 10a enable or disable functions as a function of the life cycle data LCD and possibly also the configuration data CD.

However, as described before, the life cycle signature is not erasable and can only advance to a later stage. This implementation is perfect from security point of view, because the life cycle can move only in one direction. However, the inventor has observed that it may be useful that the developer may simulate a later life cycle stage, i.e., the developer may temporarily advance the life cycle but not revert the live cycle to a previous stage, as this could create a security hole. For example, the possibility to advance the life cycle permits to test the security functionality for example during the "in-field" stage, without the need to physically write a permanent life cycle to the non-volatile memory (which would make the unit not usable anymore for testing & development purposes).

The same applies also to the 1st tier customer, which might have to test the complete system, such as a full engine-control-unit. In fact, in this case, once having advanced the life cycle to the in field stage, the processing system 10a would have to be replaced in order to return to the development stage.

Accordingly, similar to the configuration data overwrite function, it might be useful that the processing system 10a permits also an overwrite function for the life cycle data LCD in order to simulate the system behavior during later life cycle stages, avoiding the need to permanently program the life cycle data LCD.

Figure 15:
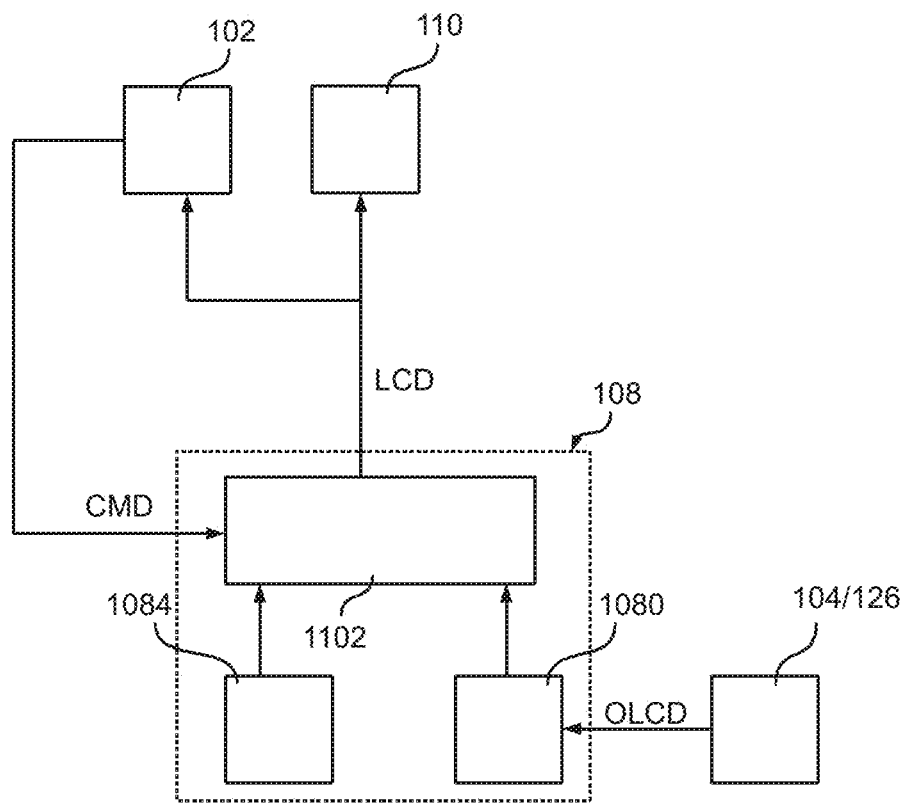
FIG. 15 shows an embodiment of a processing system comprising a configuration module enabling an overwriting of life cycle data.

FIG. 15 shows a first embodiment of a processing system 10*a* supporting a life cycle overwrite function.

As mentioned before, the life cycle data are written to a non-volatile memory, such as the memory 104 or the memory 126. Specifically, the "permanent" signature stored in this memory is called in the following original life cycle data OLCD. For example, the data read module 1080 may be configured to read these original life cycle data OLCD from the memory 104 or 126. In the embodiment considered, the original life cycle data OLCD are provided to a life cycle module 1102.

Figure 16:
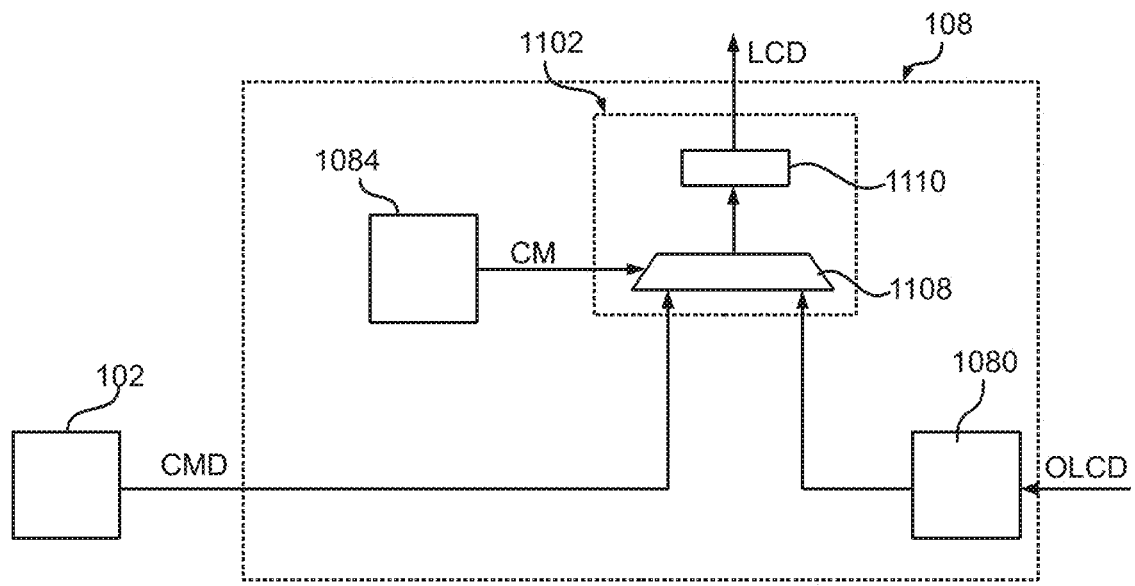
FIG. 16 shows an embodiment of the configuration module of FIG. 15.

For example, as shown in FIG. 16, the life cycle module 1102 may comprise an internal register 1110, in which the original life cycle data OLCD are stored. For example, again this operation may be managed by the state control module 1084, e.g., the state control module may drive the life cycle module 1102, such that the life cycle module 1102 stores the original life cycle data OLCD in the internal register 1110, e.g., when the processing system 10*a* is in the configuration phase (following the reset state). For example, as schematically shown in FIG. 16, the life cycle module 1102 may comprise a multiplexer 1108, which receives at input the original life cycle data OLCD and which stores the original life cycle data OLCD in the register 1110, e.g., when a configuration mode signal CM indicates that the configuration mode is activated.

Accordingly, the life cycle module 1102 provides the life cycle data LCD, which, at the end of the configuration state of the processing system 10*a*, correspond to the original life cycle data OLCD stored in the non-volatile memory 104 or 126. Specifically, in the embodiment considered, the life cycle data LCD are stored in a global register 1110 providing the life cycle data to one or more blocks 110, while the configuration data CD are distributed via the dispatch module 1082 to various configuration data clients 112.

In the embodiment considered, the configuration module 108 supports also a life cycle data overwrite mode. Specifically, in the embodiment considered, the module 108 is configured to receive a command CMD. Generally, also in this case, the command CMD may be provided directly by a communication interface of the processing system 10*a*, or preferably the command CMD is generated by the processing unit 102 of the processing system 10*a*, e.g., the command CMD may be generated by means of software instructions executed by a microprocessor 102 of a microcontroller 10*a*.

For example, in various embodiments, the register 1110 is a register addressable by the processing unit 102, so called special function registers of the processing system 10*a*. In this case, the processing unit 102 may thus write the content of the registers 1110 by means of the command CMD. For example, as schematically shown in FIG. 16, the life cycle module 1102, in particular the multiplexer 1108, may receive at input the command CMD containing new life cycle data and store the new life cycle data in the register 1110, e.g., when the configuration mode signal CM indicates that the configuration mode is deactivated.

Accordingly, in the embodiment considered, the processing unit 102 may read the content of the register 1110 and overwrite the content of the register 1110, thereby temporarily changing the life cycle data LCD, while the original life cycle data OLCD stored in the memory 104 or 126 remain unchanged. Specifically, in the embodiment considered, the overwrite mode is enabled once the state control module 1084 deactivates the configuration mode state.

Figure 17:
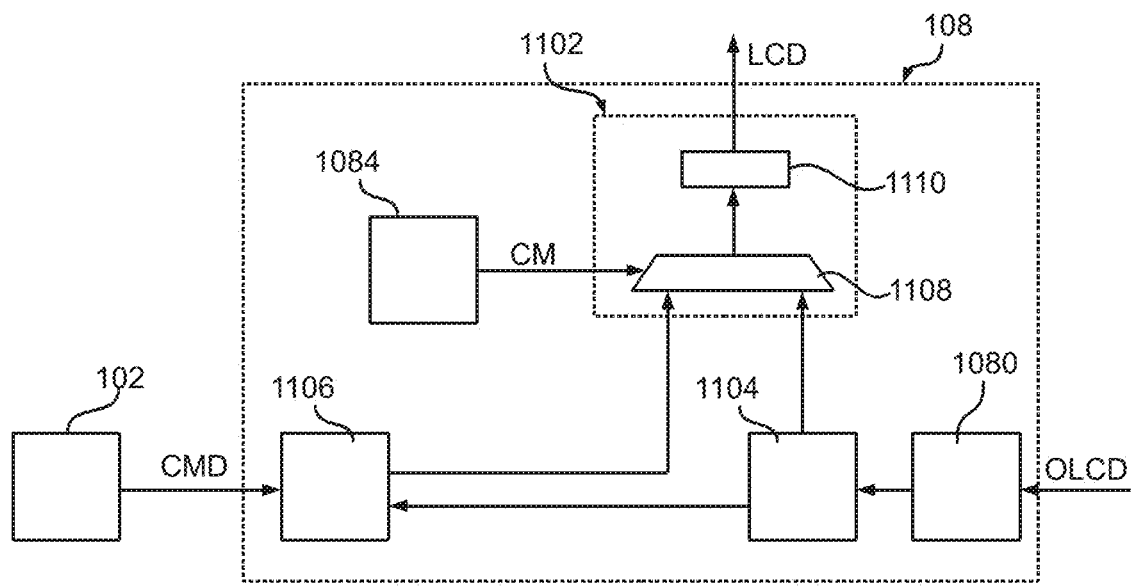
FIG. 17 shows an embodiment of a configuration module comprising an access control module.

FIG. 17 shows a further embodiment, in which the configuration module 108 comprise also an access control module 1106 configured to selectively enable or disable write access to the register 1110.

Specifically, in various embodiments, the access control module 1106 is configured to permit an overwriting of the content of the register 1110 as a function of the original life cycle data OLCD.

For example, in the embodiment considered, the original life cycle data OLCD are stored for this purpose also in a further register 1104 of the configuration module 108. Specifically, in the embodiment considered, the processing unit 102 and the other blocks 110 do not have write (and possibly also read) access to the register 1104.

Figure 18:
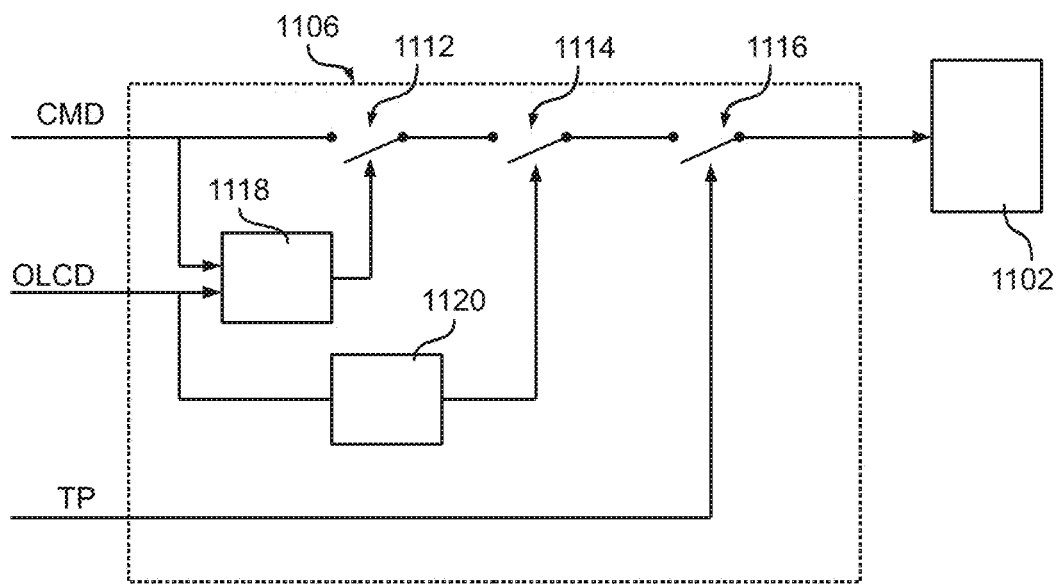
FIG. 18 shows an embodiment of the access control module of FIG. 17.

FIG. 18 shows a possible embodiment of the access control module 1106.

Specifically, in the embodiment considered, the access control module 1106 is configured to permit an overwriting of the content of the register 1110 only when the command CMD contains new life cycle data, which advance with respect to the original life cycle data OLCD, i.e., the access control module 1106 ensures that the register 1110 may only contain life cycle data LCD which indicate a life cycle being equal to or greater than the original life cycle indicated by the original life cycle data OLCD. For example, in the embodiment considered, the access control module 1106 compares at a comparator block 1118 the new life cycle data included in the command CMD with the original life cycle data OLCD stored in the register 1104 in order to determine whether the new life cycle data may be stored in the register 1110. For example, this is schematically shown by an electronic switch 1112, which is configured to selectively interrupt the connection of the command CMD to the life cycle module 1102 as a function of the signal at the output of the comparator 1118.

Accordingly, in the embodiment considered, the access control module 1106 selectively enables or disabled write access to the register 1110 in order to ensures that it is impossible to temporarily reverse the life cycle, but the life cycle may only be advanced, e.g., for test purposes.

Additionally or alternatively, the access control module 1106 may perform also further controls. For example, in various embodiments, the access control module 1106 may selectively enable or disabled write access to the register 1110 when the life cycle indicated by the original life cycle data OLCD correspond to one or more reference life cycles. For example, the write access may be disabled when the life cycle indicated by the original life cycle data OLCD does not correspond to the production stage or the customer delivery stage. Accordingly, in this case, the life cycle data overwrite function is always disabled when the life cycle indicated by the original life cycle data OLCD is in the OEM production, in-field or failure analysis stage. For example, in the embodiment considered, the access control module 1106 comprises a comparison block 1120 configured to compare the original life cycle data OLCD with one or more reference life cycle data and drive a switch 1114 configured to selectively interrupt the connection of the command CMD to the life cycle module 1102.

In various embodiments, the access control module 1106 may monitor a pin, usually indicated as test pin TP, in order to decide whether the write access to the register 1110 is enabled or not. For example, write access may be disabled when the test pin TP is set to the logic level low, while write access may by enabled as described in the foregoing when the test pin TP is set to the logic level high. For example, this is schematically shown by an electronic switch 1116, which selectively interrupts the connection of the command CMD to the life cycle module 1102 as a function of the signal provided by the test pin TP.

Accordingly, by adopting the solution proposed, during the initial testing and development stages it is also possible to simulate the behavior of the security architecture during subsequent life cycle stages without the need to physically use different units for each test or development scenario. However, the solution adopted does not compromise the overall security as it allows only simulation following life cycle stages.

Keyword verification will now be described.

In various embodiments, one or more of the access control modules described in the foregoing (modules 1088, 1088*b* and/or 1106) may also verify a keyword and selectively disable the write access when the keyword K provided does not correspond to a reference keyword RK.

Figure 19:
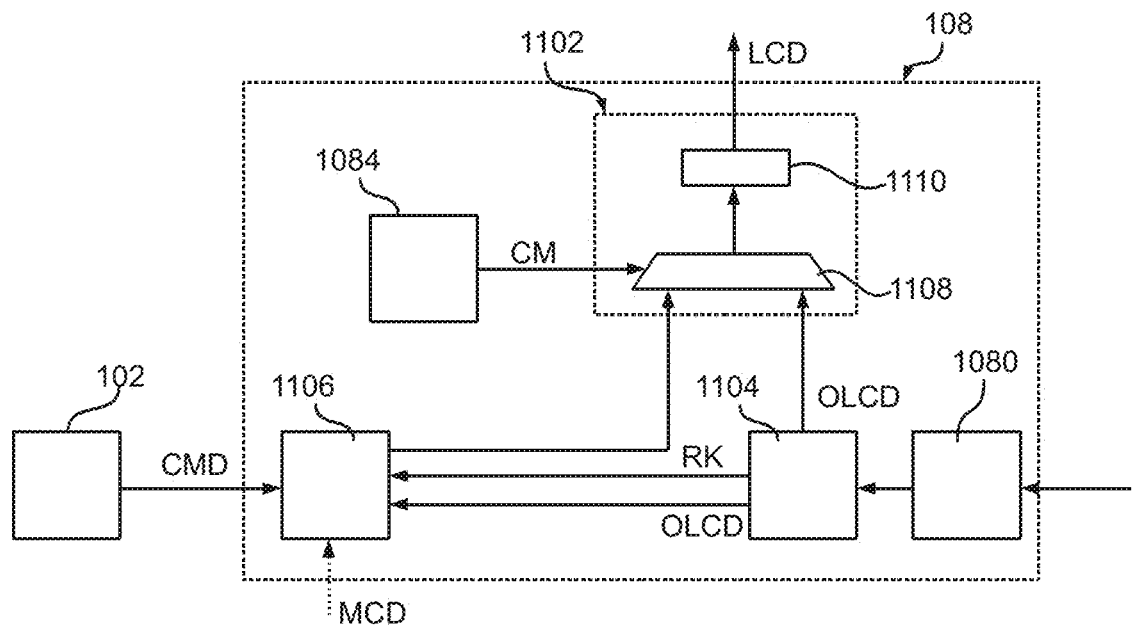
FIGS. 19 and 20 show further embodiments of configuration modules comprising an access control module.

For example, FIG. 19 shows first embodiment at the example of the module 1106, however the same verification may also be implemented in the modules 1088 and/or 1088*b*.

Specifically, in the embodiment considered, the reference keyword RK may be stored together with the life cycle data in the non-volatile memory 104 or 126, i.e., the reference keyword RK may be set once, e.g., by the producer of the processing system 10*a* or the firmware developer. In this case, the reference keyword RK may be read from the non-volatile memory and stored in a register of the configuration module 108, e.g., the register 1104.

In various embodiment, the access control module 1106 (1088 and/or 1088*b*), e.g., the block 1118, may verify whether the command CMD comprises also a keyword K corresponding to the reference keyword RK and disable the write access when the command CMD does not comprises a keyword K corresponding to the reference keyword RK. Generally, the processing unit 102 may also provide the keyword K and the new life cycle data with two different commands, e.g., by writing the respective data to two special function register having different addresses.

Accordingly, in the embodiment considered, the processing unit 102 may selectively enable the write access by providing the correct keyword K.

Alternatively, the keyword K may also be stored in the calibration data CD. For example, the keyword K may be provided with the mode configuration data MCD of the configuration module 108 described in the foregoing (see in particular FIGS. 11 and 12). Accordingly, in this case, the reference keyword RK may be set once, e.g., by the producer of the processing system 10*a*, and the firmware developer may selectively enable the write access by storing the keyword K with the calibration data CD.

Figure 20:
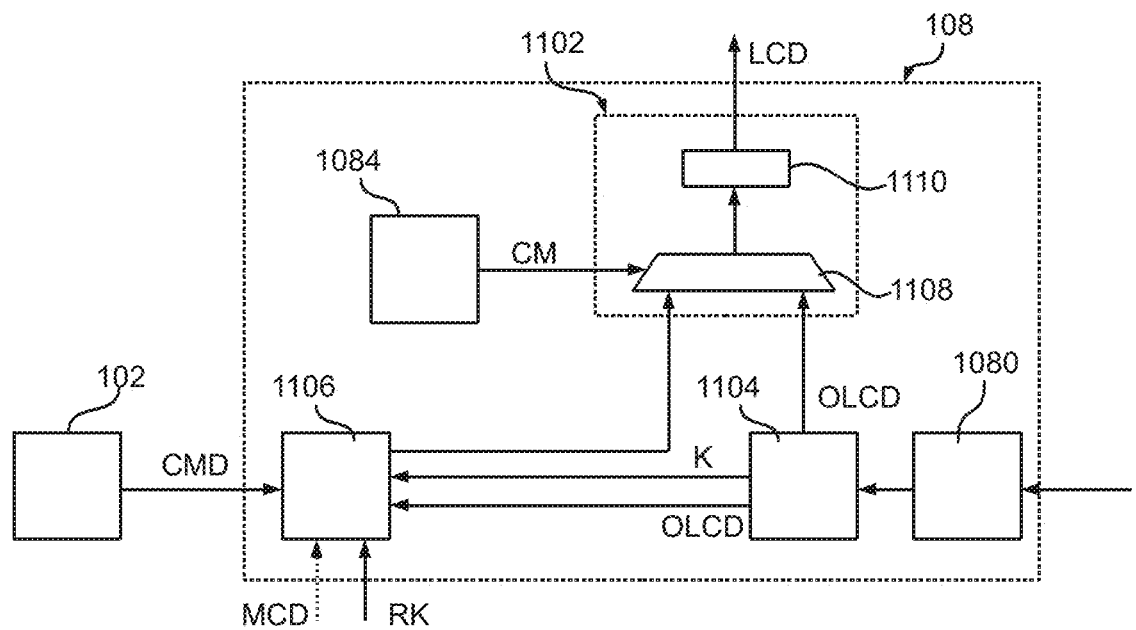

FIG. 20 shows an alternative embodiment (again without loss of generality at the example of the access control module 1106), wherein the reference keyword RK is hardwired. In this case, the keyword K to be tested may be provided by the processing unit 102 via the command CMD. Alternatively, the keyword K may be read together with the original life cycle data OLCD and, e.g., provided via the register 1104, or the keyword K may be read together with the configuration data CD and, e.g., provided via the mode configuration data MCD.

Specifically, in various embodiments, the keyword K to be tested is stored together with the original life cycle data OLCD and may thus be programmed only once, i.e., the value may not be altered anymore. For example, in this way, the producer of the processing system 10*a* may decide whether the firmware developer may use the life cycle data overwrite function by programming a correct or incorrect keyword in the memory 104/126 containing the original life cycle data OLCD.

Preferably, the reference keyword corresponds to a complex sequence of "1"s and "0"s, rendering it almost impossible to try to alter the value of the reference keyword RK and/or the keyword K with side-channel attacks, like exposing the non-volatile memory cells to electro-magnetic radiations.

In various embodiments, the configuration data and/or life cycle data write access is thus enabled, only when each of the check implemented (e.g., value of the original life cycle, new life cycle advances, test pin, and/or keyword check) signals that the write access is enabled. In this case, write access is disabled when one or more of the checks signals that the write access is disabled.

For example, in various embodiments, the above mechanisms may be combined and the processing unit 102 may temporarily active a life cycle advanced with respect to the original life cycle, only when:

the test pin TP is set to the logic level "1"

a specific keyword is programmed into the non-volatile memory, and the original life cycle equals the production or customer delivery stage.

Without prejudice to the principle of the invention, the details of construction and the embodiments may vary widely with respect to what has been described and illustrated herein purely by way of example, without thereby departing from the scope of the present invention, as defined by the ensuing claims. For example, based on the specific implementation of the blocks 110, the configuration data overwrite function and the life cycle data overwrite function may be used separately or in combination.

What is claimed is:

1. A processing system comprising:
   a processing unit;
   a hardware block configured to change operation as a function of life cycle data;
   a one-time programmable memory comprising original life cycle data; and
   a hardware configuration module configured to read the original life cycle data from the one-time programmable memory and provide the original life cycle data to the hardware block;
   wherein the hardware configuration module comprises a register providing the life cycle data used to change operation of the hardware block; and
   wherein the hardware configuration module is configured to store the original life cycle data in the register and receive a command from the processing unit, the command comprising a write request for storing new life cycle data in the register.

2. The processing system according to claim 1, wherein the hardware configuration module is configured to selectively execute the write request, thereby overwriting the original life cycle data stored in the register with the new life cycle data.

3. The processing system according to claim 2, wherein the hardware configuration module is configured to selectively execute the write request by:
   comparing the new life cycle data with the original life cycle data in order to determine whether a life cycle stage indicated by the new life cycle data corresponds to a life cycle stage being advanced with respect to the life cycle stage indicated by the original life cycle data; and inhibiting execution of the write request when the life cycle stage indicated by the new life cycle data does not correspond to a life cycle stage being advanced with respect to the life cycle stage indicated by the original life cycle data.

4. The processing system according to claim 2, wherein the hardware configuration module is configured to selectively execute the write request by:

determining whether the original life cycle data correspond to one or more reference life cycle data; and inhibiting execution of the write request when the original life cycle data do not correspond to the one or more reference life cycle data.

5. The processing system according to any of claim 2, wherein the hardware configuration module is configured to selectively execute the write request by:

receiving a reference keyword and a keyword;
comparing the reference keyword with the keyword; and
inhibiting execution of the write request when the reference keyword does not correspond to the keyword.

6. The processing system according to claim 5, wherein the reference keyword is hardwired and the keyword is stored in the one-time programmable memory.

7. The processing system according to claim 1, wherein the processing system comprises a write circuit configured to write one or more bits of the original life cycle data stored in the one-time programmable memory, thereby advancing the life cycle indicated by the original life cycle data.

8. The processing system according to claim 1, wherein the processing unit comprises a microprocessor configured to generate the command via software instructions.

9. The processing system according to claim 1, wherein the processing system is incorporated in a micro-controller.

10. A vehicle comprising a plurality of processing systems according to claim 1.

11. A method of operating a processing system according claim 1, the method comprising:

storing original life cycle data in the one-time programmable memory of the processing system;
starting the processing system;
providing the original life cycle data stored in the one-time programmable memory of the processing system via the hardware configuration module of the processing system to the hardware block of the processing system; and
sending via the processing unit of the processing system a command comprising a write request to the hardware configuration module of the processing system, the write request comprising new life cycle data.

12. A method comprising:

providing a one-time programmable memory that stores original life cycle data, the one-time programmable memory being part of a processing system;
starting the processing system;
reading the original life cycle data from the one-time programmable memory;
storing the original life cycle data in a register;
providing the original life cycle data to a hardware block of the processing system, the hardware block configured to change operation as a function of life cycle data;
receiving a write request; and selectively executing the write request by overwriting the original life cycle data stored in the register with new life cycle data; and
providing the new life cycle data to the hardware block.

13. The method according to claim 12, wherein selectively executing the write request comprises:

comparing the new life cycle data with the original life cycle data in order to determine whether a life cycle stage indicated by the new life cycle data corresponds to a life cycle stage being advanced with respect to the life cycle stage indicated by the original life cycle data; and inhibiting execution of the write request when the life cycle stage indicated by the new life cycle data does not correspond to a life cycle stage being advanced with respect to the life cycle stage indicated by the original life cycle data.

14. The method according to claim 12, wherein selectively executing the write request comprises:

determining whether the original life cycle data correspond to one or more reference life cycle data; and inhibiting execution of the write request when the original life cycle data do not correspond to the one or more reference life cycle data.

15. The method according to claim 12, wherein selectively executing the write request comprises:

receiving a reference keyword and a keyword;
comparing the reference keyword with the keyword; and
inhibiting execution of the write request when the reference keyword does not correspond to the keyword.

16. The method according to claim 15, wherein the reference keyword is hardwired and the keyword is stored in the one-time programmable memory.

17. The method according to claim 12, further comprising writing one or more bits of the original life cycle data stored in the one-time programmable memory, thereby advancing the life cycle indicated by the original life cycle data.

18. The method according to claim 12, wherein the reading, the storing, the providing the original life cycle data, the receiving, the selectively executing, and the providing the new life cycle data are executed on a microprocessor response to software instructions.

19. A processing system comprising:

a processing unit;
a hardware block configured to change operation as a function of life cycle data;
a one-time programmable memory comprising original life cycle data; and
a hardware configuration module that comprises a register, the hardware configuration module configured to:
read the original life cycle data from the one-time programmable memory;
provide the original life cycle data to the hardware block;
store the original life cycle data in the register;
receive a write request from the processing unit;
determine whether or not the original life cycle data stored in the register is to be overwritten;
when it is determined that the original life cycle data stored in the register is to be overwritten, overwriting the original life cycle data stored in the register with new life cycle data; and
when it determined that the original life cycle data stored in the register is not to be overwritten, inhibiting execution of the write request.

20. The processing system according to claim 19, wherein the hardware configuration module is configured to:

compare the new life cycle data with the original life cycle data in order to determine whether a life cycle stage indicated by the new life cycle data corresponds to a life cycle stage being advanced with respect to the life cycle stage indicated by the original life cycle data; and inhibit execution of the write request when the life cycle stage indicated by the new life cycle data does not correspond to a life cycle stage being advanced with respect to the life cycle stage indicated by the original life cycle data.

21. The processing system according to claim 19, wherein the hardware configuration module is configured to:

determine whether the original life cycle data correspond to a reference life cycle data; and inhibit execution of the write request when the original life cycle data do not correspond to the reference life cycle data.

22. The processing system according to any of claim 19, wherein the hardware configuration module is configured to:

receive a reference keyword and a keyword;

compare the reference keyword with the keyword; and inhibit execution of the write request when the reference keyword does not correspond to the keyword.

23. The processing system according to claim 22, wherein the reference keyword is hardwired and the keyword is stored in the one-time programmable memory.

* * * * *